United States Patent
Ström et al.

(10) Patent No.: US 7,734,105 B2
(45) Date of Patent: Jun. 8, 2010

(54) MULTI-MODE IMAGE PROCESSING

(75) Inventors: Jacob Ström, Stockholm (SE); Tomas Akenine-Möller, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 741 days.

(21) Appl. No.: 10/583,453

(22) PCT Filed: Dec. 17, 2004

(86) PCT No.: PCT/SE2004/001922

§ 371 (c)(1),
(2), (4) Date: Jun. 19, 2006

(87) PCT Pub. No.: WO2005/059839

PCT Pub. Date: Jun. 30, 2005

(65) Prior Publication Data

US 2007/0071333 A1    Mar. 29, 2007

(30) Foreign Application Priority Data

Dec. 19, 2003 (SE) ................................ 0303497
Jul. 8, 2004 (SE) ................................ 0401852

(51) Int. Cl.
*G06K 9/36* (2006.01)
*G06K 9/46* (2006.01)
*G06K 9/00* (2006.01)
*H03M 5/00* (2006.01)
*H03M 7/34* (2006.01)

(52) U.S. Cl. .............. 382/239; 382/166; 382/167; 382/232; 382/233; 341/51; 341/55

(58) Field of Classification Search ............ 382/166, 382/167, 162, 235, 236, 237, 238, 239, 251, 382/232, 233; 341/50, 51, 55, 56, 65
See application file for complete search history.

(56) References Cited

U.S. PATENT DOCUMENTS 5,956,431 A * 9/1999 Iourcha et al. .............. 382/253

(Continued)

FOREIGN PATENT DOCUMENTS

WO        2005/059836 A1    6/2005

OTHER PUBLICATIONS

Said et al., "A New, Fast, and Efficient Image Codec Based on Set Partitioning in Hierarchical Trees", IEEE Transactions on Circuits and Systems for Video Technology, vol. 6, No. 3, Jun. 1996, pp. 243-250.*

(Continued)

*Primary Examiner*—Tom Y Lu
*Assistant Examiner*—Thomas A Conway
(74) *Attorney, Agent, or Firm*—Nixon Vanderhye, P.C.

(57) ABSTRACT

An image encoding and decoding scheme operable according two different modes depending on properties of the processed image is disclosed. In the encoding, an image is decomposed into image blocks (600) comprising image elements (610). The blocks (600) are compressed into block representations (700A, 700B) according to one of two compression modes. A block representation (700A; 700B) comprises two codewords (720A, 730A; 720B, 730B) representing properties of the image elements (610) in the block (600) and a sequence (740A; 740B) of image element associated indices indicative of one of the codewords (720B, 730B) or a property representation generated based on a codeword (730A). The block representation (700A; 700B) also includes a mode index representing the mode, according to which the block representation (700A; 700B) was compressed. This mode index can be provided before, during or after generation of the codewords (720A, 730A; 720B, 730B) and index sequence (740A; 740B). In the decoding, the codewords (720A, 730A; 720B, 730B) and index sequence (740A; 740B) are used to decompress the block representation (700A; 700B) according a decompression mode determined by the mode index (710A; 710B).

25 Claims, 17 Drawing Sheets

U.S. PATENT DOCUMENTS

| | | | |
|---|---|---|---|
| 6,297,826 B1 * | 10/2001 | Semba et al. | 345/589 |
| 6,404,923 B1 | 6/2002 | Chaddha | |
| 6,658,146 B1 | 12/2003 | Iourcha et al. | |
| 2003/0053706 A1 | 3/2003 | Hong et al. | |
| 2003/0090709 A1 | 5/2003 | Rijavec | |

OTHER PUBLICATIONS

Delp et al, "Image Compression Using Block Truncation Coding", IEEE Transactions on Communications, vol. COM-27, No. 9, Sep. 1979, pp. 1335-1342.

Campbell et al, "Two Bit/Pixel Full Color Encoding", Siggraph '86, Vol. 20, No. 4, Aug. 1986, pp. 215-223.

Fenney, "Texture Compression Using Low-Frequency Signal Modulation", Graphics Hardware, Jul. 2003, pp. 84-91.

Akenine-Möeller et al, "Graphics for the Masses: A Hardware Rasterization Architecture for Mobile Phones", ACM Transactions on Graphics, vol. 22, No. 3, Proceedings of ACM SIGGRAPH 2003, Jul. 2003, pp. 801-808.

International Search Report for PCT/SE2004/001922 dated Apr. 6, 2005.

* cited by examiner

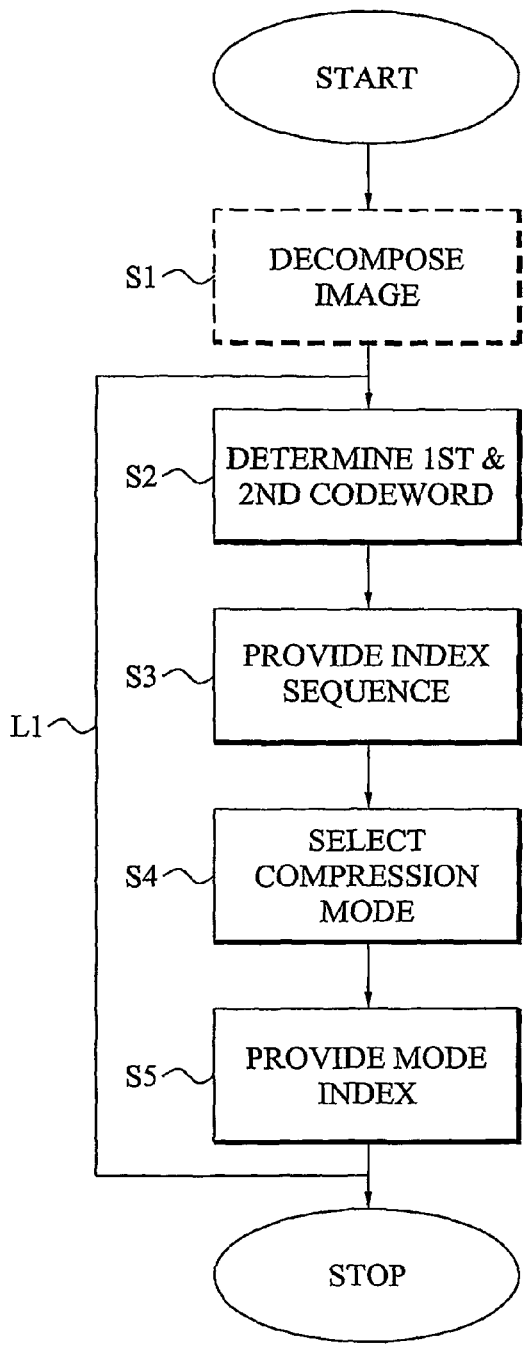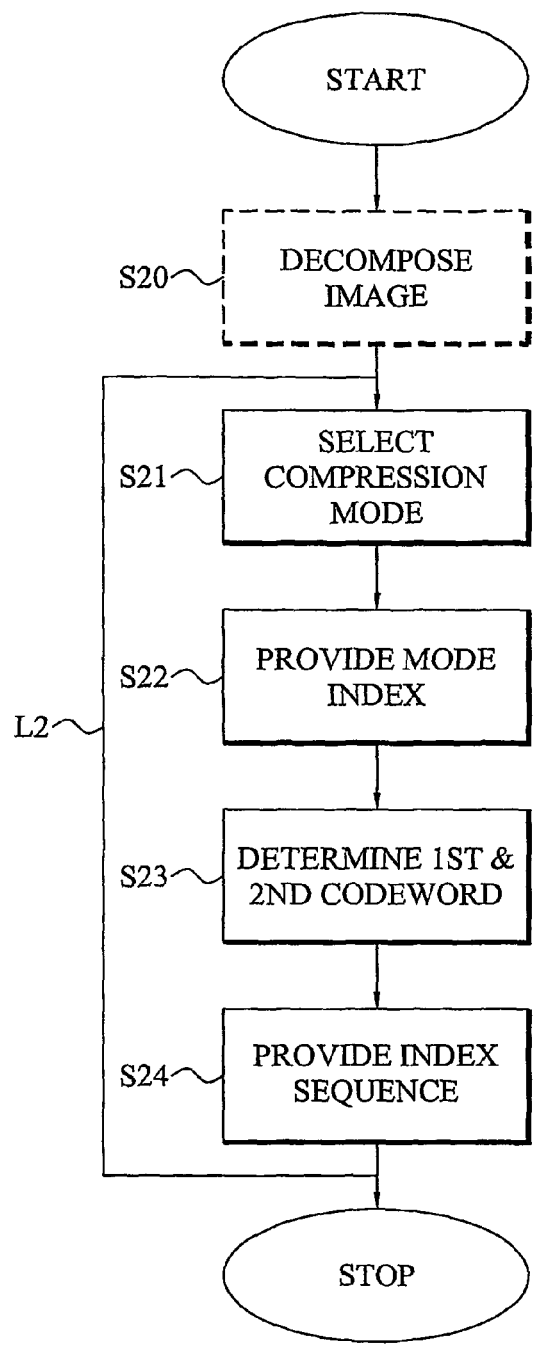
Fig. 1                    Fig. 5

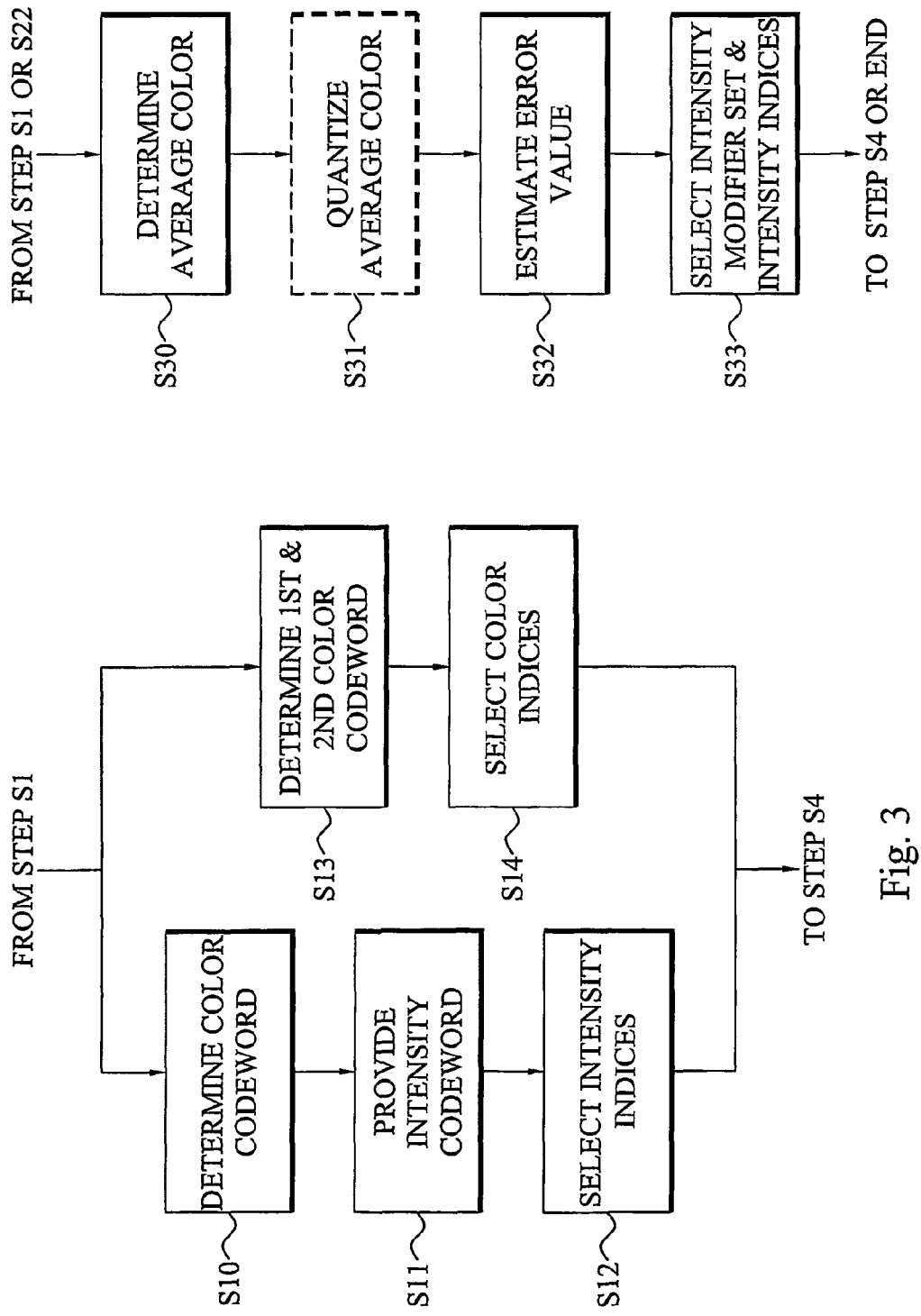

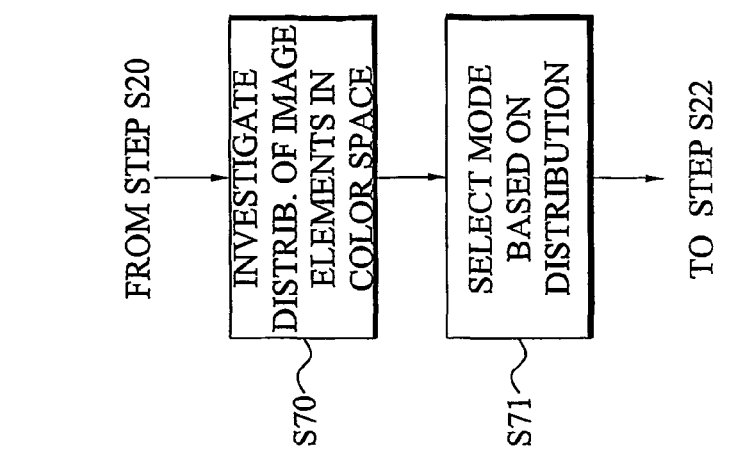
Fig. 10
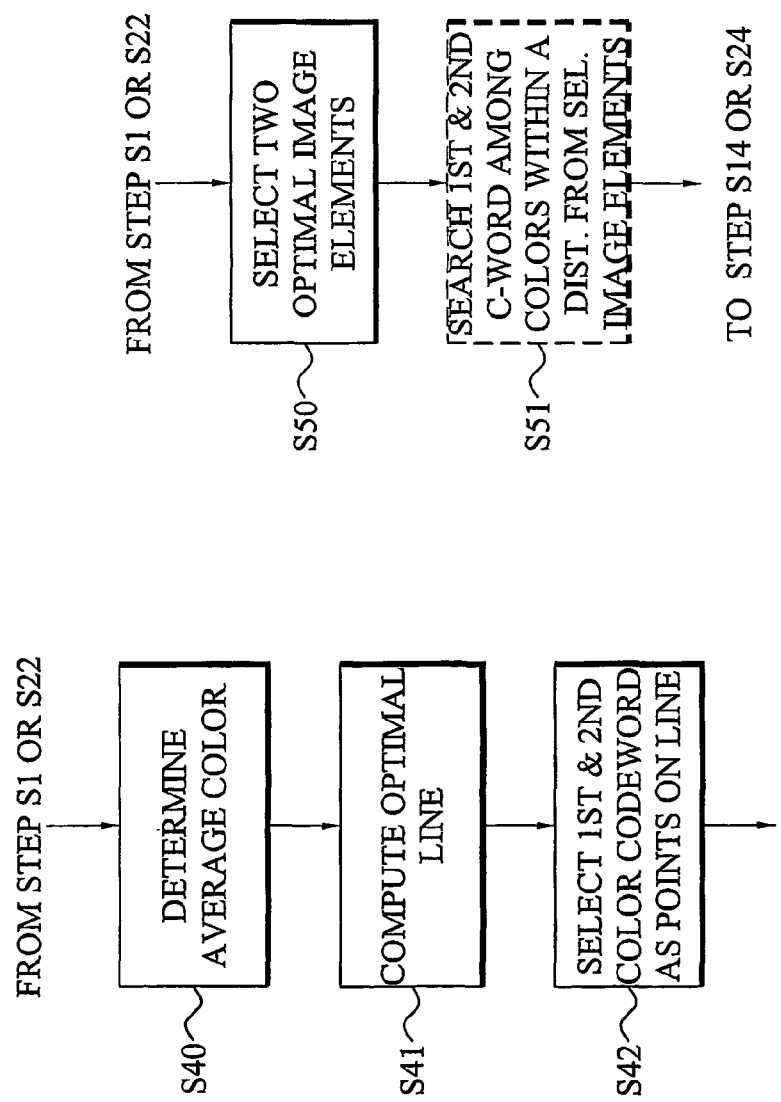
Fig. 8
Fig. 7

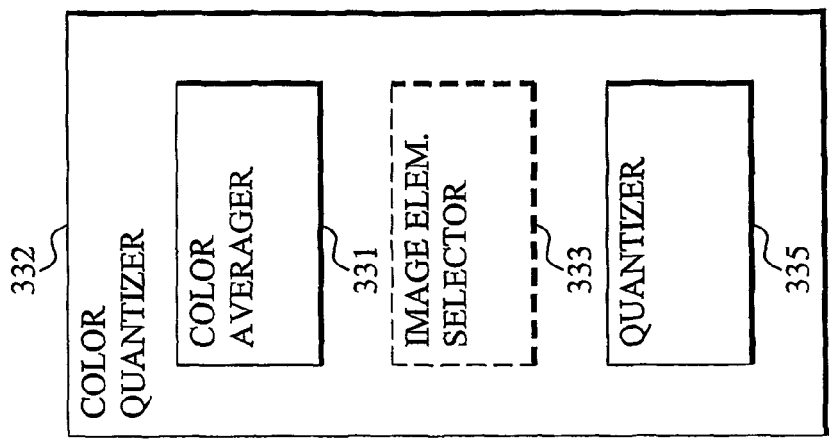
Fig. 19
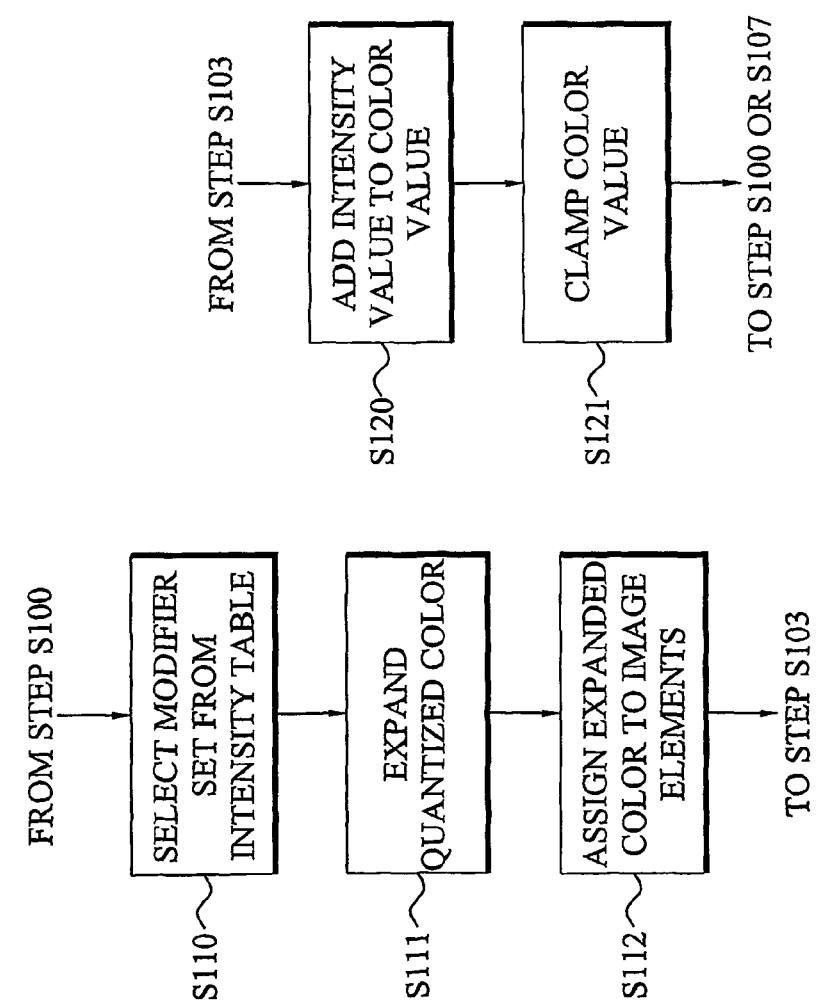
Fig. 13
Fig. 12

MULTI-MODE IMAGE PROCESSING

This application is the U.S. national phase of international application PCT/SE2004/001922 filed 17 Dec. 2004, which designated the U.S. and claims priority to SE 0303497-2 filed 19 Dec. 2003, and SE 0401852-9 filed 8 Jul. 2004, the entire contents of each of which are hereby incorporated by reference.

TECHNICAL FIELD

The present invention generally refers to image processing, and in particular to methods and systems for encoding and decoding images.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting using a z-buffer.

However, rendering of images and textures, and in particular 3D images and graphics, is a computationally expensive task in terms of memory bandwidth and processing power required for the graphic systems. In other words, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering. This reduction in bandwidth and processing power requirements is particularly important for thin clients, such as mobile units and telephones, with a small amount of memory, little memory bandwidth and limited power (powered by batteries).

In a patent description [1], Iourcha et al. disclose a texture compression scheme called S3TC (S3 Texture Compression) or DXTC (DirectX Texture Compression). An image is decomposed into a number of image blocks of 4 pixels×4 pixels. Each such image block is encoded into a bit sequence of 64 bits, thus resulting in a compression rate of 4 bpp (bits per pixel). The 64-bit sequence comprises two basic colors or color codewords (16 bits each) and a 32-bit sequence of 2-bit indices, one index for each pixel in the image block. During decoding, a color palette of four colors is generated. The first two RGB (red, green and blue) colors of the palette correspond to the two basic colors (codewords). The two additional colors, situated between the basic colors in the RGB space, are then interpolated therefrom. Each 2-bit index then identifies, for each pixel, one of the four colors of the palette to use for that pixel.

Although the S3TC scheme works fairly well for computer terminals, it is not well adapted for mobile units and other thin clients. Such mobile units typically only have memory busses of 16 or 32 bits at best. Thus, at least two, and possibly up to four, memory accesses are required to read out the 64-bit compressed version of an image block, if S3TC is implemented in a mobile unit. In addition, during the interpolation of the two additional colors of the color palette, multiplication by ⅓ and ⅔ is performed, which is not ideal in hardware. The compression using S3TC is also relatively time consuming, at least on a mobile terminal.

SUMMARY

The technology disclosed herein provides an efficient image processing and an efficient image encoding and image decoding.

In one of its aspects the technology disclosed herein also provides image encoding and decoding adapted for usage in thin clients with low memory and memory bandwidth capacity.

In one of its aspects the technology disclosed herein also provides image encoding and decoding that can be operated according to different operational modes depending on the properties of the image portion to be encoded or decoded.

Briefly, the technology disclosed herein involves multi-mode image processing in the form of encoding (compressing) an image and decoding (decompressing) an encoded (compressed) image.

According to an example embodiment, an image to be encoded is decomposed into a number of image blocks comprising multiple image elements (pixels, texture elements, texels, or volume elements voxels). An image block preferably comprises, but is not limited to, eight image elements and has a size of $2^m \times 2^n$ image elements, where m=3−n and n=0, 1, 2, 3, or a size of $2^m \times 2^n \times 2^p$, where m, n, p=0, 1, 2, 3 and preferably m+n+p=3. Each image element in a block is characterized by a color, e.g. a 24-bit RGB (red, green, blue) color. The individual image blocks are then compressed.

In this lossy block compression, two codewords representing properties of the image elements in the block are determined. Furthermore, an index sequence of image element associated indices is provided for the block. This sequence comprises, for at least a subset of the image elements in the block, an index associated with one of the codewords or a property representation generated based on one of the codewords.

The block compression of the technology disclosed herein can be performed according to one of two different compression modes. The use of two different compression modes provides flexibility to the encoding method by being able to better adapt to the properties of the individual image blocks in the image. As a consequence of having a choice, per block basis, between two different compression modes, the image quality of the processed image is improved compared to the prior art encoding schemes with a single (fixed) encoding. The first compression mode is particularly suitable for compressing image blocks having image elements of similar colors and preserves the luminance components better than the chrominance components. The second compression could be viewed as an auxiliary mode employed in situations where the first compression mode gives a poor result, e.g. when the image elements of the block basically could be grouped into two clusters of different colors.

As a consequence, the block compression further includes selecting a compression mode for the current image block and generating a mode index indicative of the selected compression mode. This mode selection can be performed before determining the codewords and index sequence, preferably based on an investigation of the properties of the image elements in the block, e.g. based on the distribution of the color values of the image elements in the color space. Alternatively, the mode selection is made during or after generation of the codewords and index sequence. In the latter case, two compressed representations of the image block will be produced, one according to the first compression mode and one according to the second mode. A first quality measure or error value associated with compressing the image block according to the first mode is determined using the block representation compressed according to this first mode. Correspondingly, also a second quality measure or error value associate with compressing the image block according to the second mode is determined using the block representation compressed according to the second mode. These two measures are then compared, and the compression mode resulting in highest quality (smallest error value) is selected. The block representation compressed according this selected block will be used as encoded representation for the current block.

In either case, the resulting encoded image block then comprises a mode index, two codewords and the index sequence.

If the mode index represents the first compression mode, the first codeword is a color codeword that is a representation of the colors of the image elements in the image block. The second codeword is an intensity codeword that is a representation of a set of multiple intensity modifiers that are used (during decoding) for modifying or modulating the intensity of the image elements in the block. The index sequence will then include an intensity index for each image element in the image block. Each such intensity index is associated with an intensity modifier from the intensity modifier set.

The resulting block representation compressed according to the first mode comprises the mode index, preferably 1 bit, the color codeword, preferably 12 bits, the intensity codeword, preferably 3 bits, and a sequence of the intensity indices, preferably 8×2=16 bits. The resulting size of a preferred embodiment of the block encoded according to the first mode is, thus, only 32 bits and a compression rate of 4 bits per pixel (image element) is obtained.

However, if the mode index represents the second compression mode, the two codewords are a respective color codeword representing the colors of the image elements in the block, preferably of at least a first and a second portion of the image elements in the block, respectively. The index sequence then includes, for a first subset of the image elements in the block, a color index associated with one of the two color codewords. A remaining second subset of the image elements in the block preferably has a pre-defined association with one of the color codewords so that no color index is required for the image element(s) of this remaining subset.

The resulting block representation compressed according to the second mode comprises the mode index, preferably 1 bit, the first color codeword, preferably 12 bits, the second color codeword, preferably 12 bits, and a sequence of the color indices, preferably 7×1=7 bits. The resulting size of an encoded image block is, thus, preferably only 32 bits and a compression rate of 4 bits per pixel (image element) is obtained.

During decoding, the compressed image block(s) that should be decompressed is identified and fetched from e.g. a memory location. Once the correct compressed image block is identified a decompression mode to use for the block is determined based on a decompression mode index found in the compressed block.

If this mode index represents a first decompression mode, an intensity modifier set is provided. This modifier set is provided based on the intensity codeword in the compressed image block. This set provision is preferably performed by identifying, by means of the intensity codeword, an intensity modifier set from an intensity table comprising multiple modifier sets. Thereafter, a color representation is generated for at least one of the image elements of the image block. This color generation is performed based on the color codeword in the compressed block representation. The intensity modifier to use for the image element that should be decoded is selected from the provided modifier set based on the intensity index associated with the image element and found in the intensity index sequence. Once the correct intensity modifier value is selected, the intensity of the image element is modified with this value.

If the mode index represents a second decompression mode, a color representation is generated, for each image element that should be decoded, based on a color codeword selected from the first or second color codeword.

This color codeword is preferably selected from the first or second color codeword using a color index (from the index sequence) associated with the relevant image element belonging to the first subset of image elements. However, an image element belonging to the second remaining subset of the image elements has a pre-defined color codeword and, thus, no associated color index. As a consequence, the color representation for the image elements in this second subset is generated based on the pre-defined color codeword.

Due to the small (32-bit) size of an encoded image block, the technology disclosed herein is well adapted for thin clients with limited memory capacity and bandwidth. In addition, the encoding is very fast so that it can be performed also in terminals with low clock frequencies. Furthermore, the decoding can extremely simply be implemented in e.g. hardware using only a few standard components.

The technology disclosed herein offers the following advantages:

Gives high quality (peak signal/noise ratio) for different image types due to usage of two potential compression and decompression operational modes;

Hardware implementation of decoding is extremely simple;

Encoding is very fast, which enables implementations also in terminals with low clock frequencies;

Exhaustive encoding is possible at feasible speed on a computer for the first compression operational mode; and Encoded image data has a size that is suited for thin clients with limited memory capacity and bandwidth.

Other advantages offered by the technology disclosed herein will be appreciated upon reading of the below description of the example embodiments.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating an embodiment of an image encoding method according to an example embodiment;

FIG. 3 is flow diagram illustrating the codeword determining step and the sequence providing step of FIG. 1 in more detail;

FIG. 5 is a flow diagram illustrating another embodiment of an image encoding method according to an example embodiment;

FIG. 6 is flow diagram illustrating the codeword determining step and the sequence providing step of FIG. 1 or 2 in more detail for a first compression mode;

FIG. 7 is a flow diagram illustrating an embodiment of the codeword determining step of FIG. 1 or 5 in more detail for a second compression mode;

FIG. 8 is a flow diagram illustrating another embodiment of the codeword determining step of FIG. 1 or 5 in more detail for a second compression mode;

FIG. 10 is a flow diagram illustrating the compression mode selecting step of FIG. 5 in more detail;

FIG. 12 is a flow diagram illustrating the steps of providing intensity modifier set and generating color representation of FIG. 11 in more detail;

FIG. 13 is a flow diagram illustrating the intensity modifying step of FIG. 11 in more detail;

Figure 14:
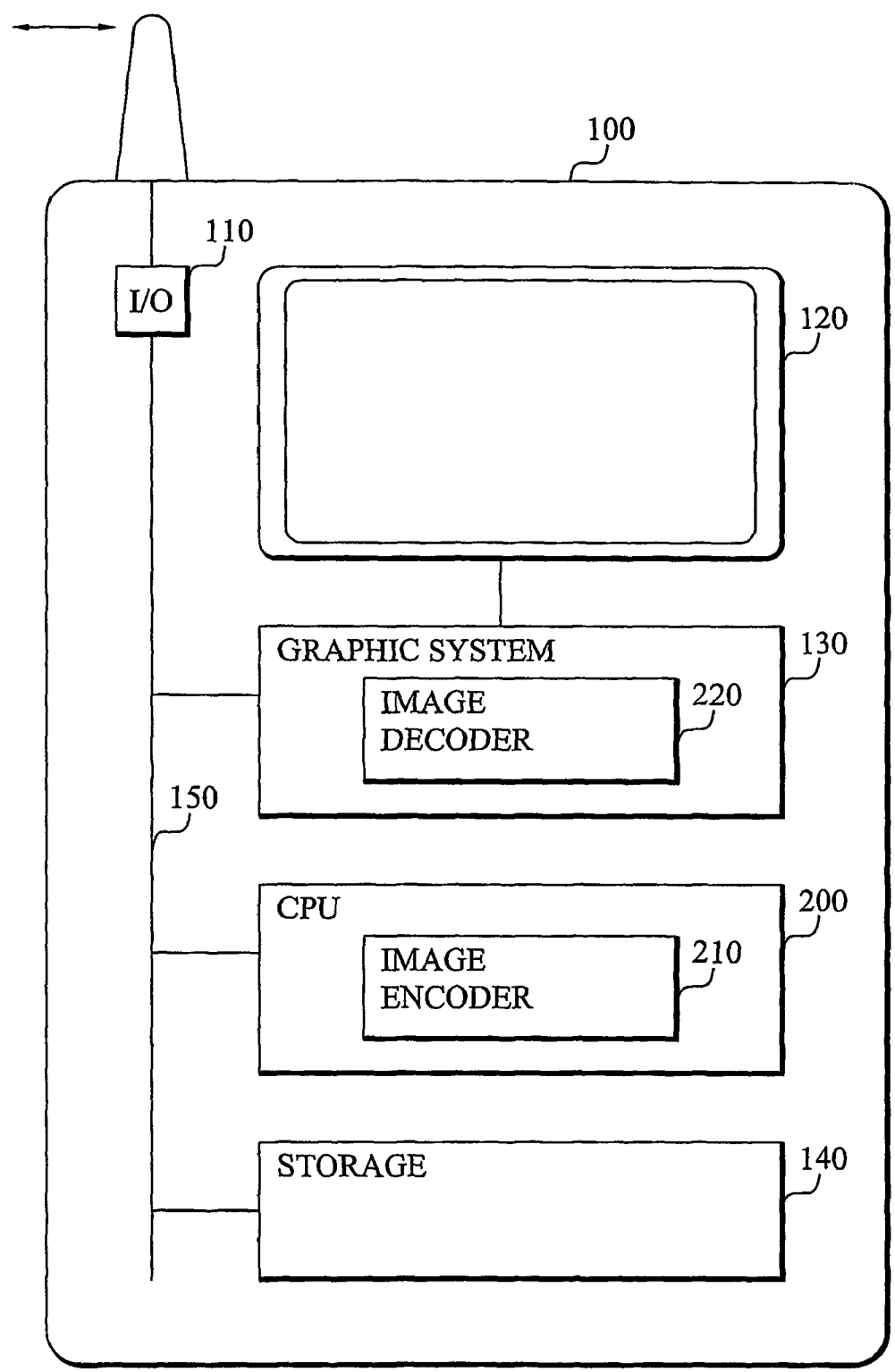
Figure 18:
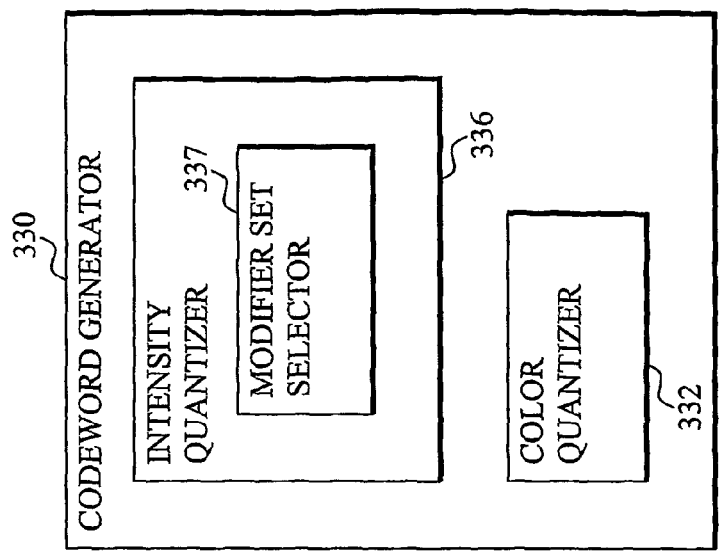
Figure 16:
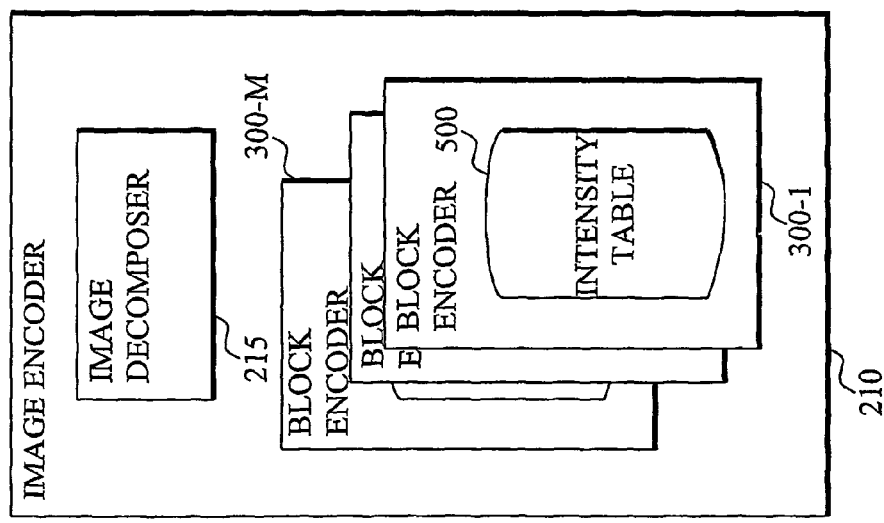
Figure 15:
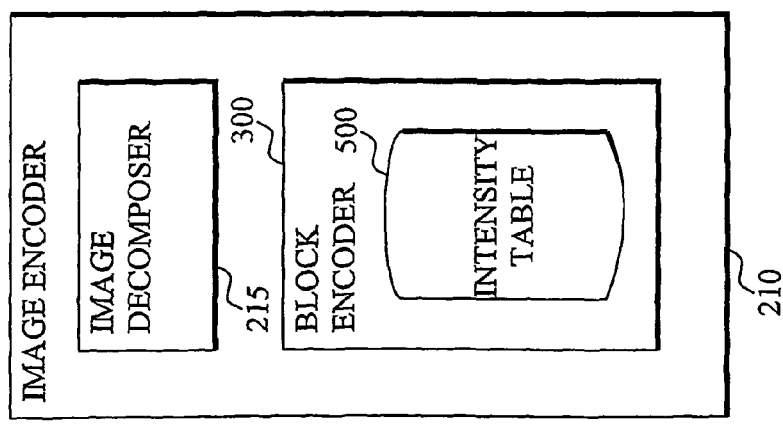
Figure 20:
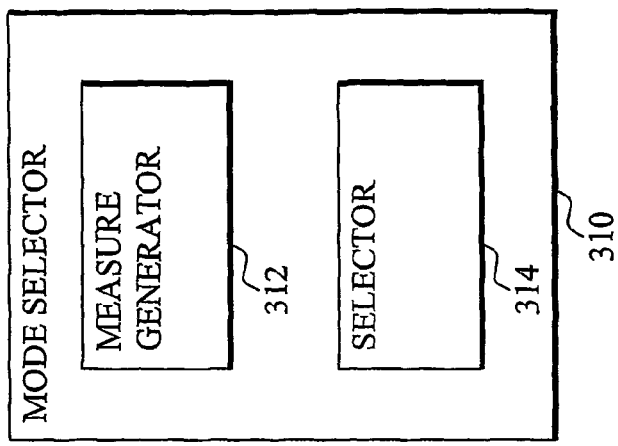
Figure 17:
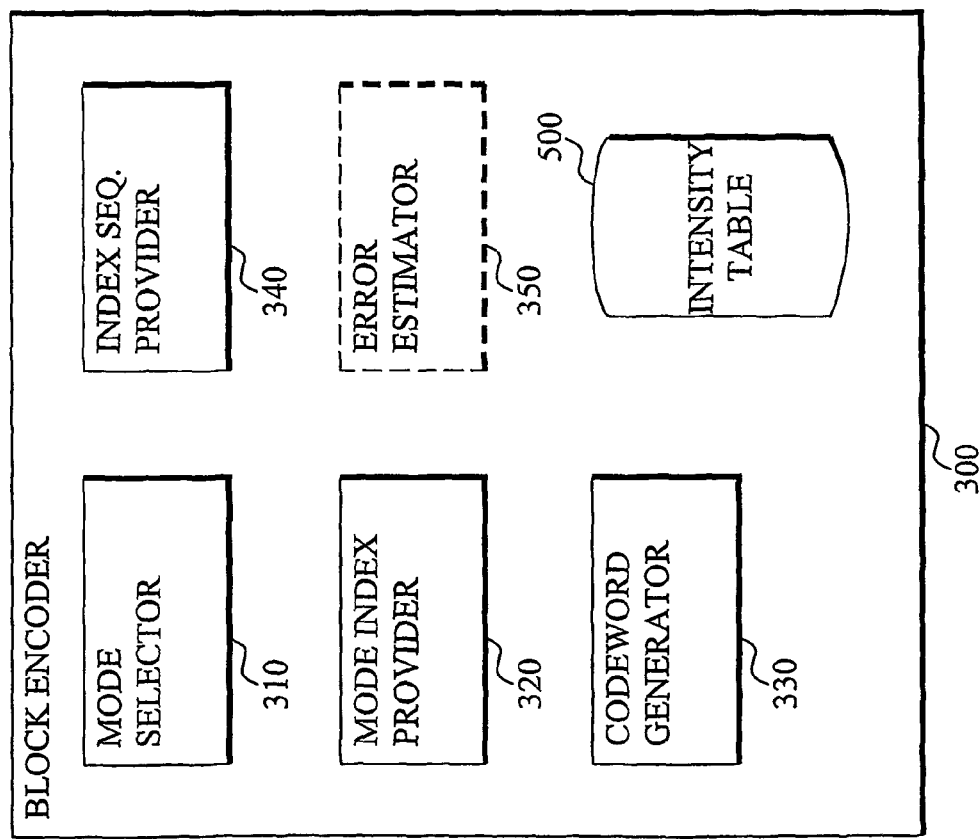
Figure 22:
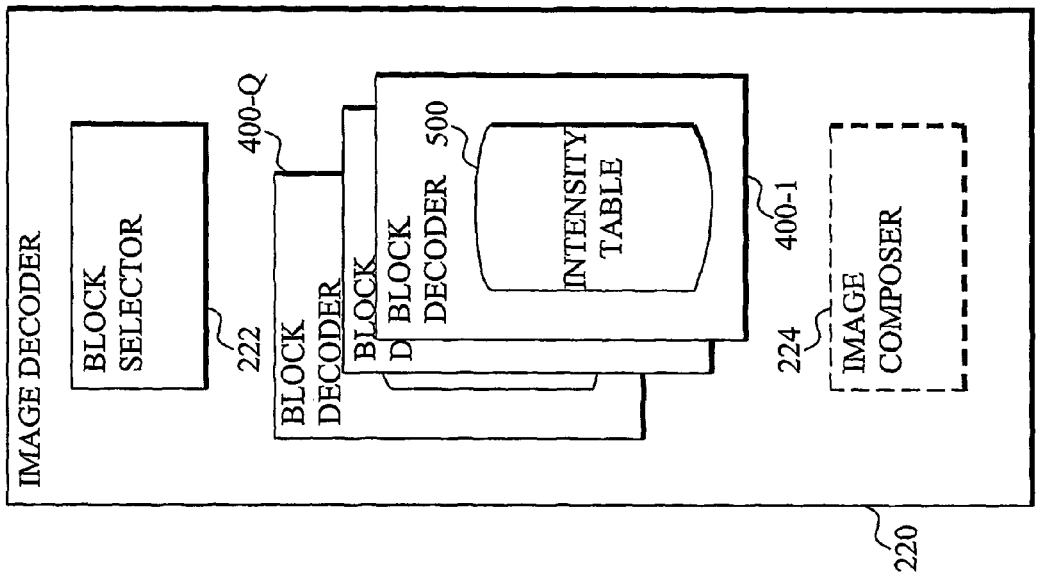
Figure 21:
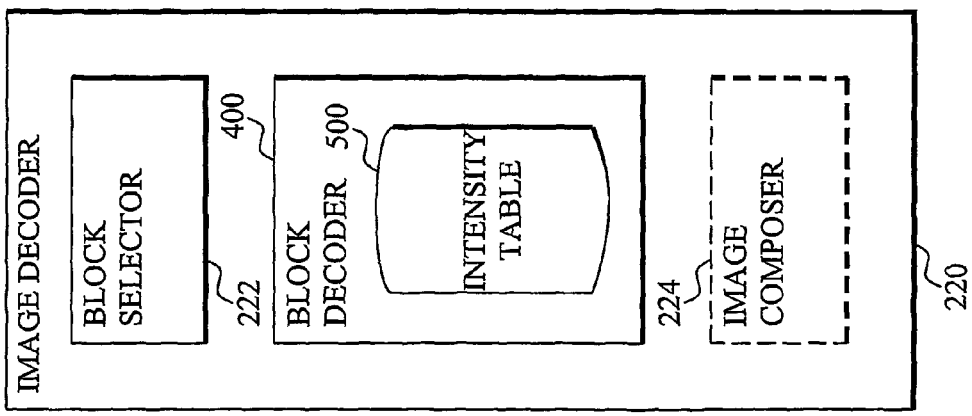
Figure 23:
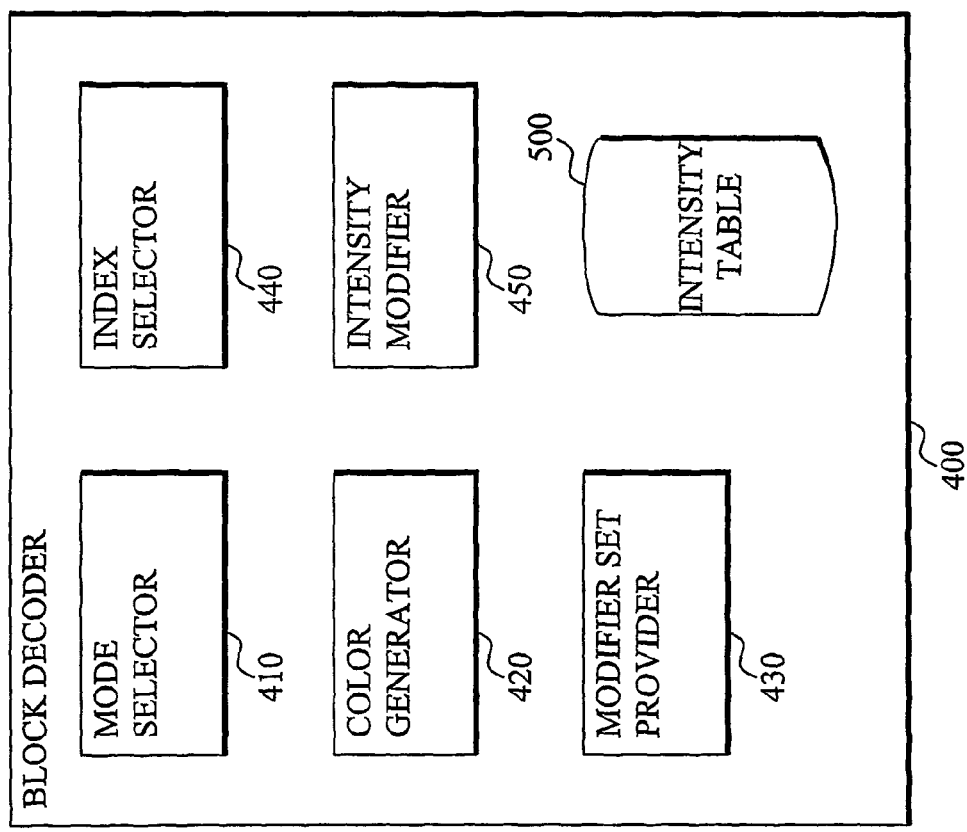
Figure 24:
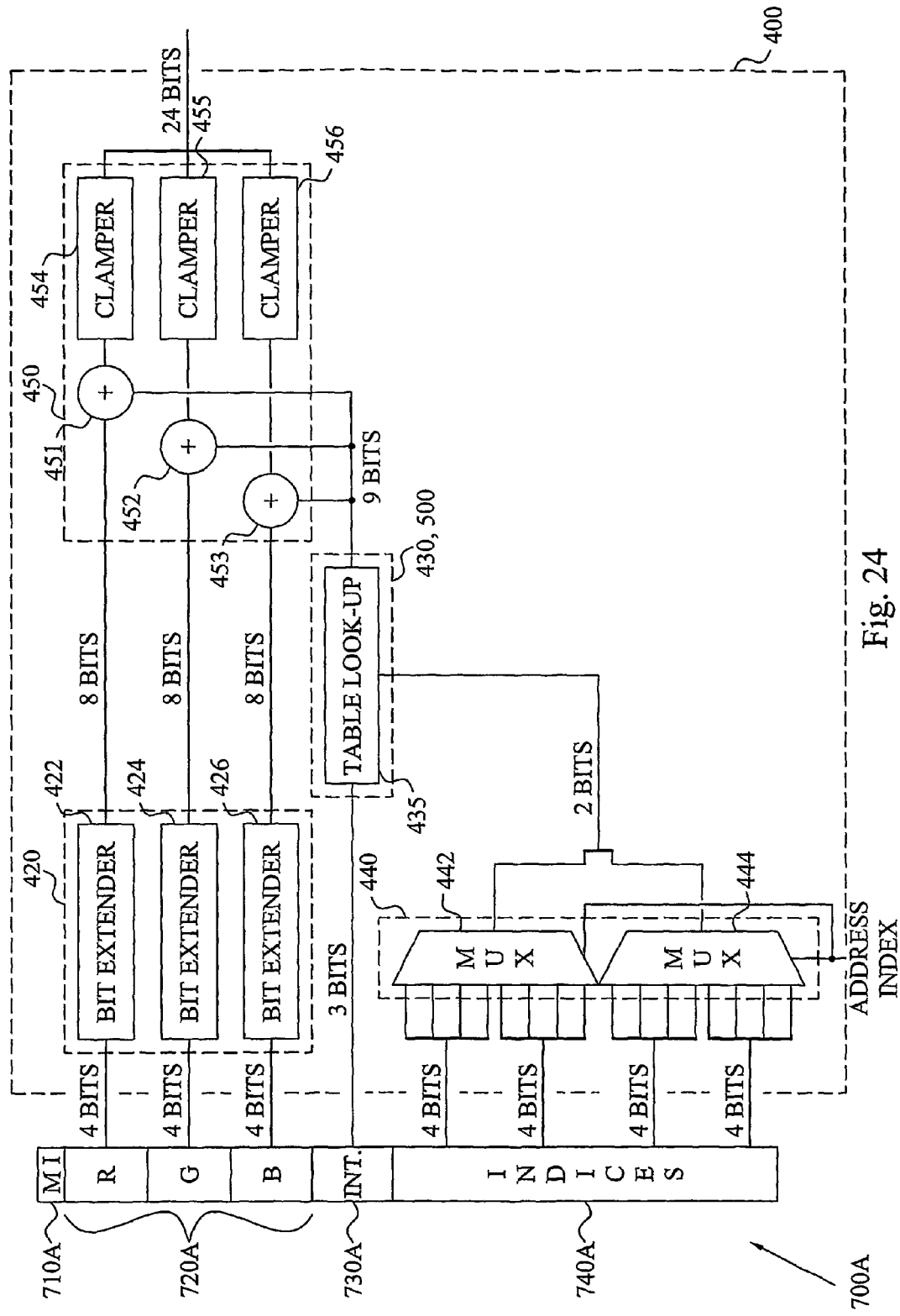
Figure 25:
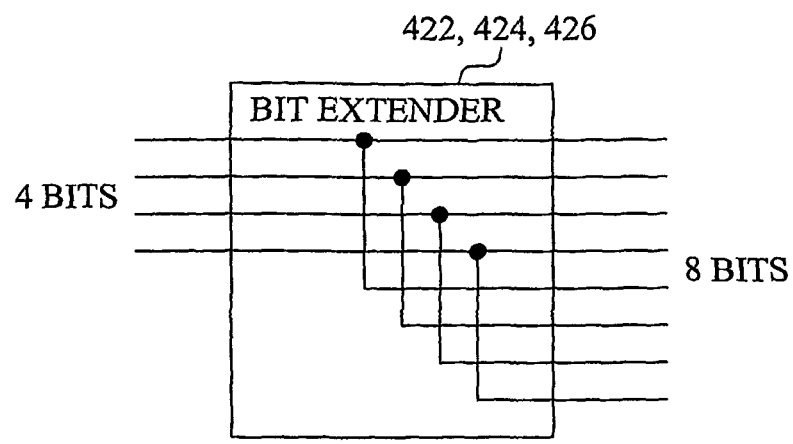
Figure 26:
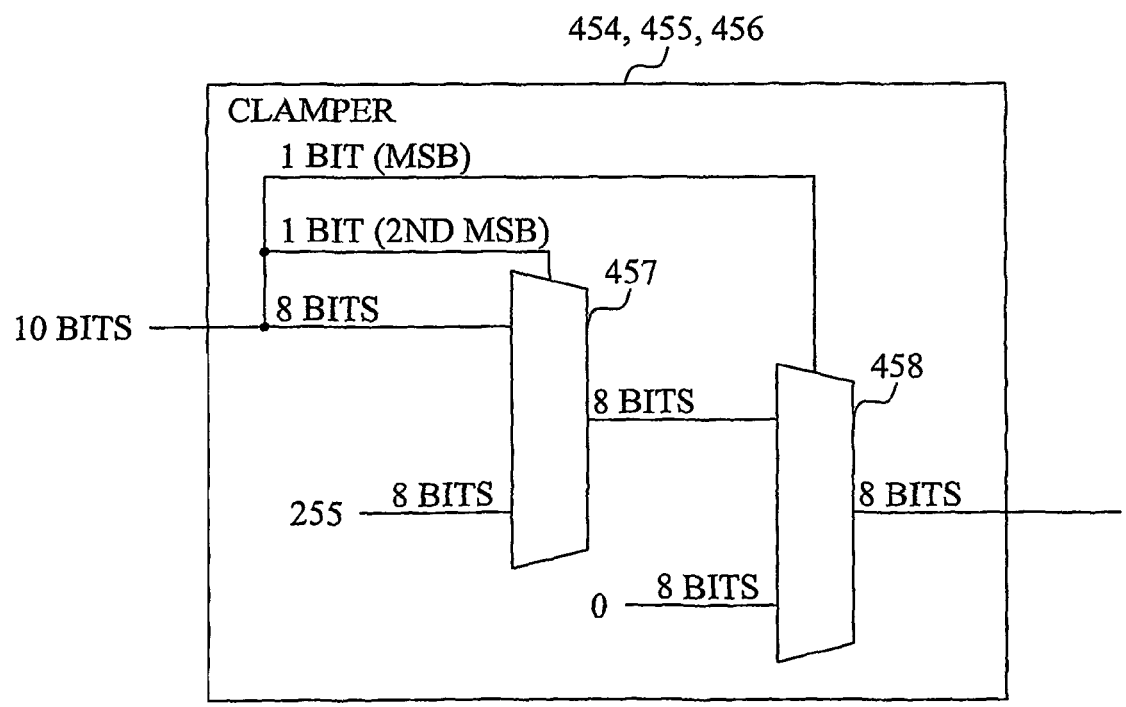
Figure 27:
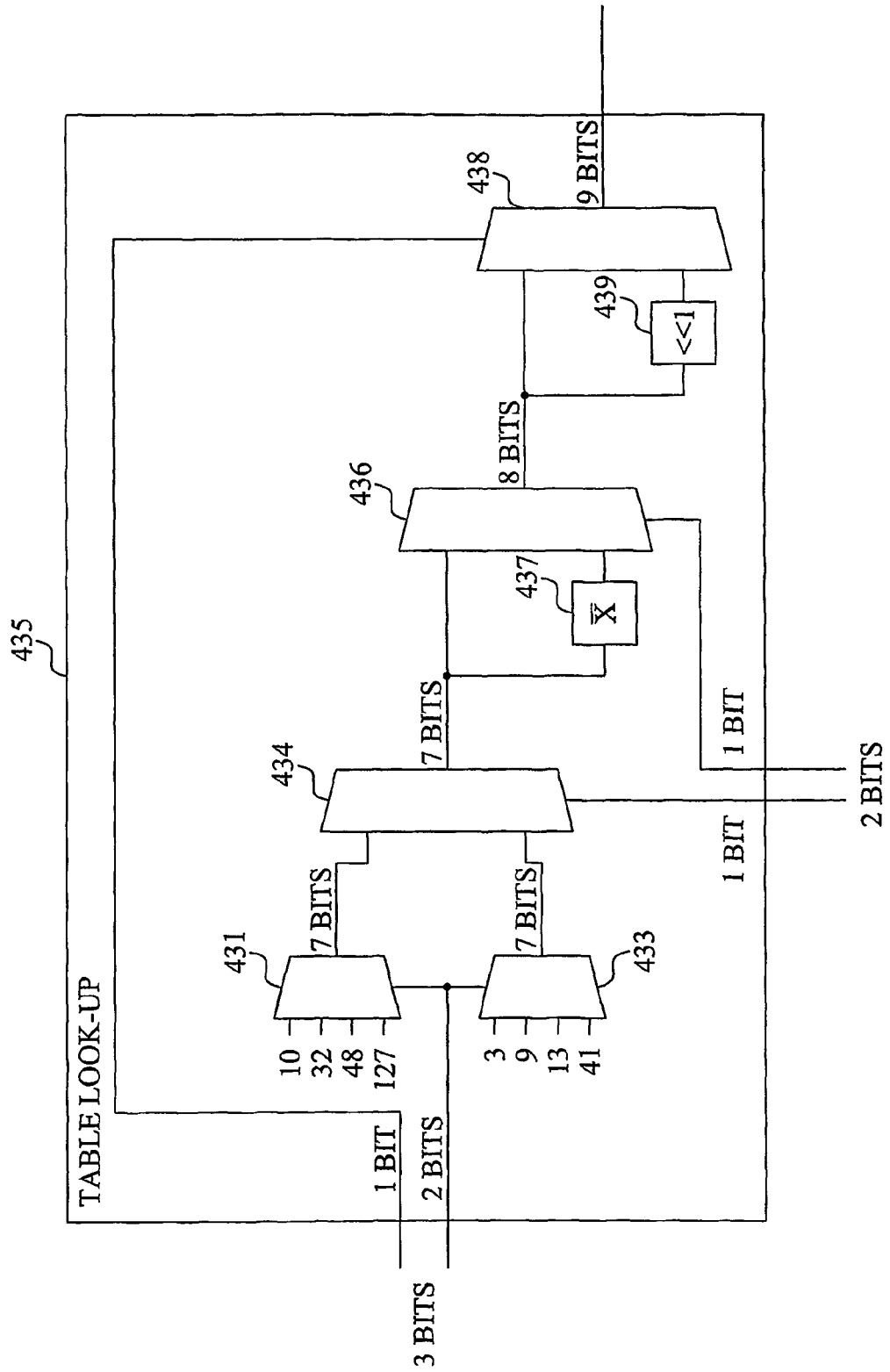
Figure 28:
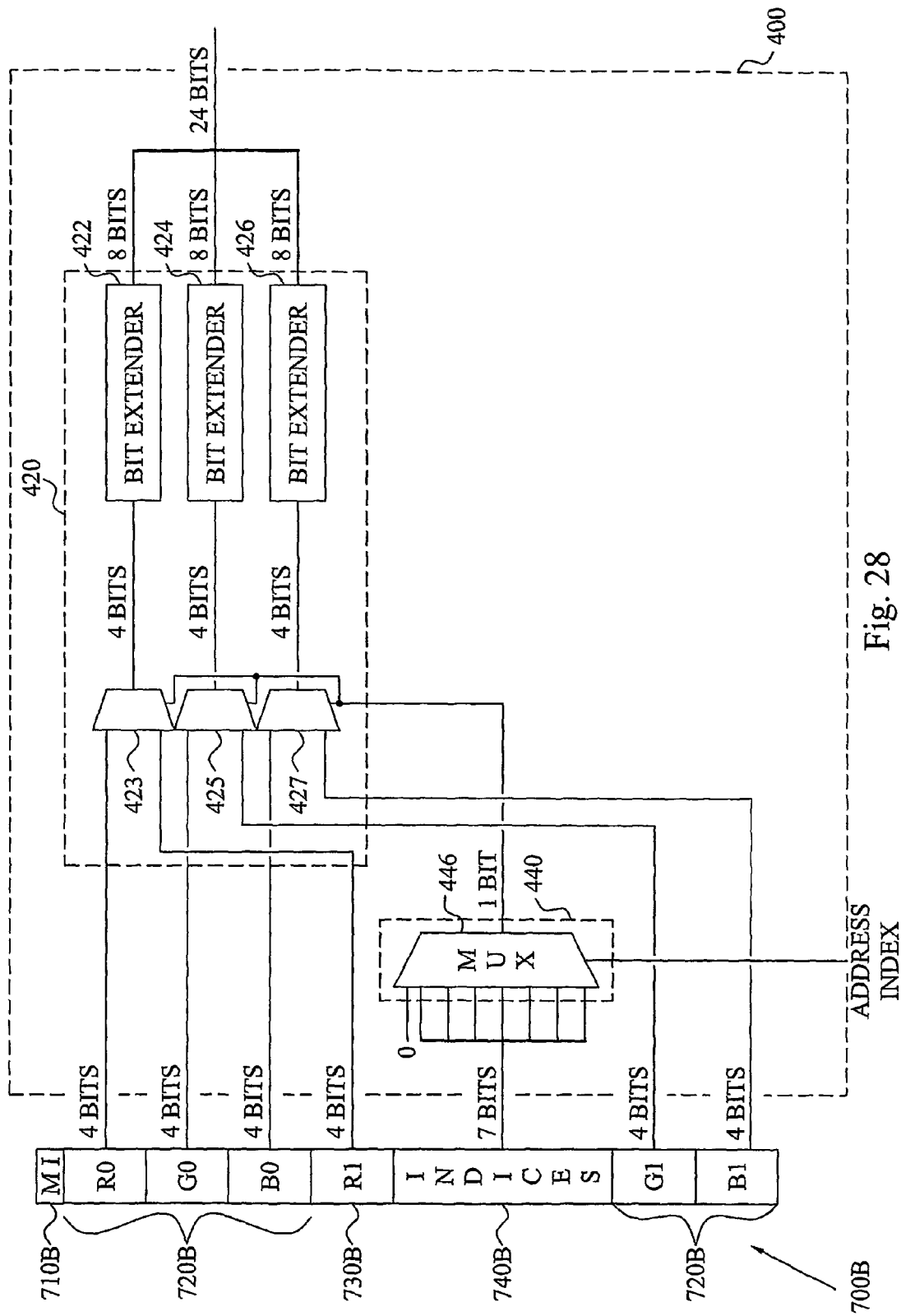
Figure 29:
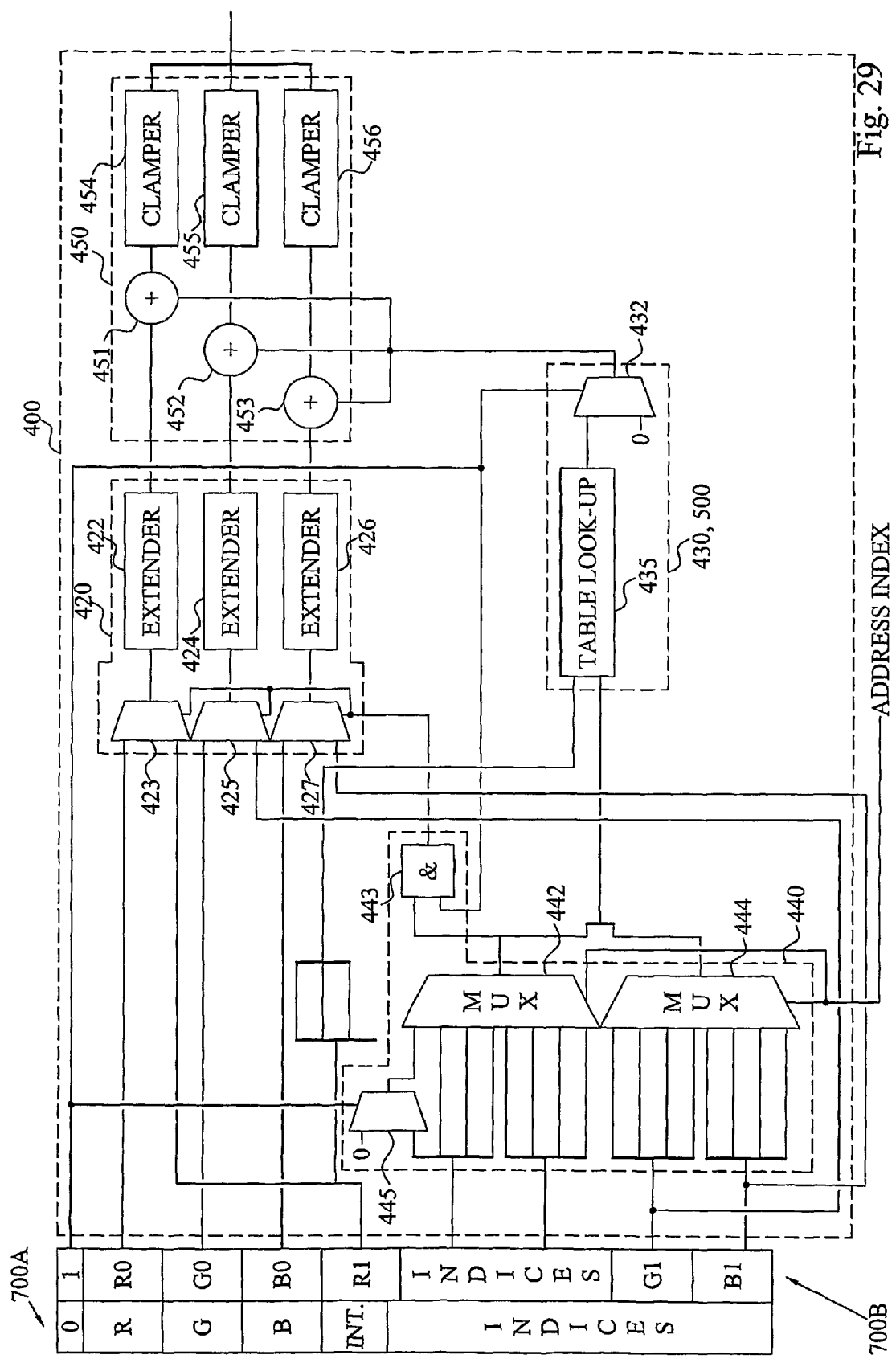

FIG. 14 schematically illustrates an example of a user terminal with an image encoder and decoder according to an example embodiment;

FIG. 15 is a block diagram schematically illustrating an embodiment of an image encoder according to an example embodiment;

FIG. 16 is a block diagram schematically illustrating another embodiment of an image encoder according an example embodiment;

FIG. 17 is a block diagram schematically illustrating an embodiment of a block encoder according to an example embodiment;

FIG. 18 is a block diagram schematically illustrating the codeword generator of the block encoder of FIG. 17 in more detail;

FIG. 19 is a block diagram schematically illustrating the color quantizer of the codeword generator of FIG. 18 in more detail;

FIG. 20 is a block diagram schematically illustrating the mode selector of the block encoder of FIG. 17 in more detail;

FIG. 21 is a block diagram schematically illustrating an example embodiment of an image decoder an example embodiment;

FIG. 22 is a block diagram schematically illustrating another embodiment of an image decoder according to an example embodiment;

FIG. 23 is a block diagram schematically illustrating an embodiment of a block decoder according to an example embodiment;

FIG. 24 is a hardware block diagram schematically illustrating an embodiment of a block decoder according to an example embodiment operating in a first decompression mode;

FIG. 25 is hardware block diagram illustrating an embodiment of the bit extenders of FIG. 24 in more detail;

FIG. 26 is hardware block diagram illustrating an embodiment of the clampers of FIG. 24 in more detail;

FIG. 27 is a hardware block diagram illustrating an embodiment of the table look-up of FIG. 24 in more detail;

FIG. 28 is a hardware block diagram schematically illustrating an embodiment of a block decoder according to the present invention operating in a second decompression mode; and FIG. 29 is a hardware block diagram schematically illustrating an embodiment of a block decoder according to an example embodiment and adapted for operation according to a first or second decompression mode.

DETAILED DESCRIPTION

Throughout the drawings, the same reference characters will be used for corresponding or similar elements.

The technology disclosed herein relates to image and graphic processing, and in particular to encoding or compressing images and decoding or decompressing encoded (compressed) images Generally, during image encoding, an image is decomposed or divided into a number of image blocks. Each such image block then comprises multiple, i.e. at least two, image elements having image element associated properties, among others, a certain color. The image blocks are then encoded or compressed to generate an encoded representation of the image.

When an encoded image is to be displayed on a screen, or a geometric primitive associated with the encoded image is to be rendered, the relevant image elements of the encoded image blocks are identified and decoded. These decoded image elements can then be used to generate a decoded representation of the original image for display, or they can be used for rendering the geometric primitive.

The technology disclosed herein is well adapted for usage with three-dimensional (3D) graphics and images, such as photos, text and "synthetic" images, all of which can be used in applications, such as games, 3D maps and scenes, 3D messages, e.g. animated messages, screen savers, man-machine interfaces (MMIs), etc., but is not limited thereto. Thus, the technology disclosed herein could also be employed for encoding other types of images or graphics, e.g. one-dimensional (1D), two-dimensional (2D) or 3D images.

In the technology disclosed herein the expression "image element" refers to an element in an image block or encoded (compressed) representation of an image block. This image block, in turn, corresponds to a portion of an image or texture. Thus, according to an example embodiment, an image element could be a texel of a (1D, 2D or 3D) texture or a pixel of a (1D, 2D or 3D) image. Correspondingly, an image element could be a voxel in a 3D texture or image. Generally, an image element is characterized by certain image-element-associated properties, such as a color value or a normal map vector. Furthermore, in the following, the term "image" is used to denote any 1D, 2D or 3D image or texture that can be encoded and decoded by means of the technology disclosed herein.

Image Encoding

Figures 2A, 2B, 4A, 4B:
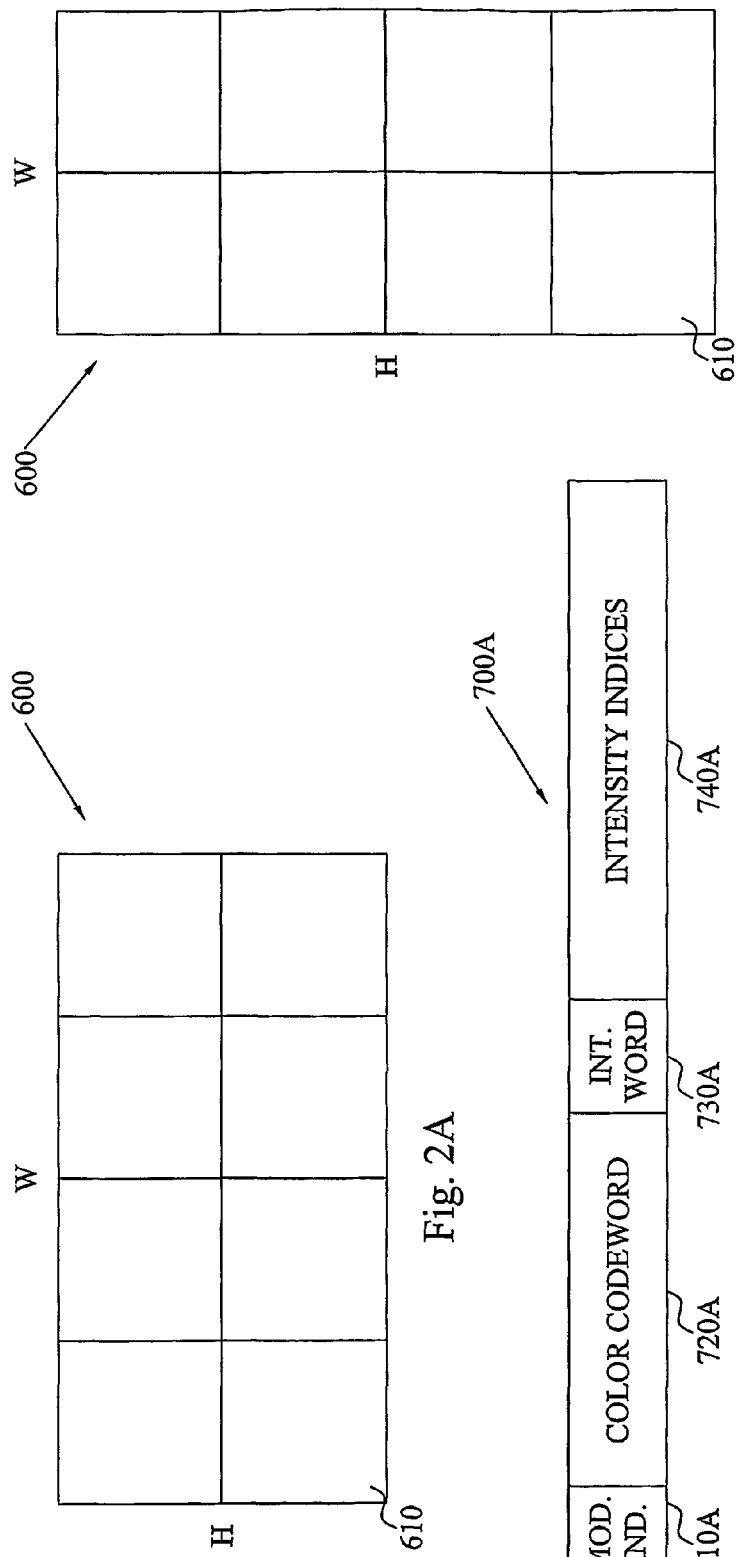
FIGS. 2A and 2B illustrate embodiments of an image block according to an example embodiment.
FIGS. 4A and 4B illustrate embodiments of compressed representations of an image block according to the an example embodiment.

FIG. 1 is a flow diagram of an embodiment of the (lossy) method of encoding an image according to an example embodiment. In a first step S1, the image is decomposed or divided into a number of image blocks. Each such image block then comprises multiple image elements. In a preferred example embodiment, an image block comprises eight image elements (pixels or texels) and has a size of $2^m \times 2^n$ image elements, where m=3–n and n=0, 1, 2, 3. More preferably, n is 1 or 2. FIGS. 2A and 2B schematically illustrate two examples of an image block 600 with eight image elements

610 according to an example embodiment. In FIG. 2A, the height is two image elements 610 and the width is four image elements 610, i.e. m=1 and n=2, whereas for the image block 600 in FIG. 2B m=2 and n=1. Correspondingly, when compressing 3D images, a preferred image block size could be 2×2×2 image elements (voxels). However, the technology disclosed herein is not limited to blocks with 8 image elements but could alternatively be used in connection with image blocks having less or more than eight image elements, e.g. 4×4 image elements.

Returning to FIG. 1, the whole image block is preferably decomposed into (non-overlapping) image blocks in step S1. However, in some applications, only a portion of an image is encoded and, thus, only this portion is decomposed into image blocks.

The following steps S2 to S5 perform an encoding or compression of the image blocks. In this embodiment of the image block compression, basically two encoded (compressed) versions or representations of the image block are generated according to two encoding or compression modes. Each of the two encoded block representations comprises two codewords and a sequence of image element associated indices. In addition, the resulting sizes, in terms of the number of bits, of the two different encoded blocks are preferably equal.

The first compression mode is particularly suitable for compressing image blocks having image elements of similar colors and preserves the luminance components better than the chrominance components. The second compression could be viewed as an auxiliary mode employed in situations where the first compression mode gives a poor result, e.g. when the image elements of the block basically could be grouped into two clusters of different colors.

The use of two different compression modes provides flexibility to the encoding method by being able to better adapt to the individual properties of the image blocks. As a consequence of having a choice, per block basis, between two different compression modes, the image quality of the processed image is improved compared to the prior art encoding schemes with a single (fixed) encoding. As a consequence, the quality, in terms of Peak Signal/Noise Ratio (PSNR), of the two mode encoding method is improved with approximately 1 dB compared to a corresponding encoding method only having access to a single compression mode.

In step S2, a first and a second codeword are determined for the image block for each of the two compression modes, thus, resulting totally in four codewords. These codewords represent properties associated with the image elements in the block. In the first compression mode version the codewords include a color codeword and an intensity codeword. The corresponding codewords of the second compression mode version are a first and a second color codeword, which is described in more detail below. In a next step S3, an index sequence of image element associated indices is provided for each compression mode. This sequence includes, for each image element in at least a subset of the image elements in the block, an index associated with one of the first or second codeword. Alternatively, the index could be associated with a color representation or an intensity modifier provided or generated based on one of the first or second codeword.

Thus, two resulting compressed image block versions, each comprising two codewords and an index sequence, are obtained following step S3. In a next step S4, a compression mode to use for the current image block is selected. In other words, it is determined which of the two generated compressed image blocks to use as an encoded or compressed representation of the image block. This mode selection is preferably performed based on a comparison of error representations associated with the two encoded blocks. These error representations are measures indicative of an image quality representation associated with compressing the image block according to the first or second mode. Thus, the compression mode (and compressed image block) resulting or associated with the smallest error representation is selected in this step S4. In a next step S5, a mode index associated with and indicative of the selected compression mode is provided. This mode index is inserted into the compressed block representation generated using the selected compression mode.

The resulting encoded or compressed block representation, thus, includes the mode index, the first and second codeword and the index sequence.

The steps S2 to S5 are preferably repeated for all image blocks provided during the decomposing of step S1 (schematically illustrated by line L1). The result is then a sequence or file of compressed image blocks. The resulting compressed image blocks could be ordered in a file from left to right and top to bottom in the same order in which they were broken down in the block decomposing of step S1. The method then ends. As a consequence of the two compression mode, in some instances an encoded image will include image blocks compressed only according to the first or second compression mode. However, for most practical implementations, such an encoded image will typically include some block representations compressed according to the first mode and some block representations compressed according to the second mode.

The encoded image could then be provided to a memory for storage therein until a subsequent rendering, e.g. display, of the image. Furthermore, the encoded image could be provided as a signal of encoded block representations to a transmitter for (wireless or wired) transmission to another unit.

FIG. 3 is a flow diagram illustrating the codeword determining step and the index sequence providing step of FIG. 1 in more detail. In this figure the left-most three steps S10 to S12 are according to the first compression mode whereas the rightmost two steps S13 and S14 are according to the second compression mode. Thus, the steps S10 to S12 result in an image block compressed according to the first compression mode, while the steps S13 and S14 result in an image block compressed according to the second mode. Note that the steps S10 to S12 can be run in parallel with the steps S13 and S14 so that the two compressed block representations are generated more or less simultaneously. Alternatively, the block compression according to the first mode (steps S10 to S12) can be performed sequentially with the block compression according to the second mode (steps S13 and S14).

The method continues from step S1 in FIG. 1. Firstly, in step S10, a color codeword is determined for the image block. This color codeword is a representation of the colors of the image elements in the image block and is the first of the two codewords associated with the image block in this mode. In a preferred embodiment, the color codeword is a representation of an average color of the image elements of the block. The color could be a RGB (Red, Green, Blue) color, a color in the YUV space or YCrCb space, or any other color space used in image and graphics processing and management. The color codeword is preferably in the same color format (space) as the original image. However, in some cases, it may be useful to convert the image to a different color format, i.e. having the color codeword in a first color space and the original image in a second different color space. The color codeword is preferably a 12-bit color-representation sequence. For example, a RGB color codeword could comprise 4 bits for the red color component, 4 bits for the green component and 4 bits for the blue component. Correspondingly, a YUV color codeword could include 6 bits, 3 bits and 3 bits, respectively, for the three different components in this mode.

Thereafter, an intensity codeword is provided in step S11. This intensity codeword is a representation of a set of multiple intensity modifiers that are used (during decoding) for modifying the intensity of the image elements in the image block and is the second of the two codewords associated with the image block.

In a preferred example embodiment, the intensity codeword is an index or representation allowing identification of an intensity modifier set. This index could then identify or point to the set in a table or codebook comprising several different intensity modifier sets. Each set comprises two or more intensity modifier values, preferably at least four modifier values. In a preferred embodiment, the modifier values of a set are mathematically complementary values, i.e. each set is preferably symmetrical.

The intensity table preferably comprises sets including small intensity modifier values, which are adapted for allowing representation of smoothly changing surfaces. In addition, the table preferably also comprises sets that include large intensity modifier values, which are adapted for allowing representation of sharp edges.

The actual intensity modifier values of the sets in the table can be found by starting with random values and then optimizing these values using a number of different optimization schemes and algorithms, such as versions of the LBG-algorithm (Linde, Buzo and Gray) [2], simulated annealing and coordinate search, which are known to a person skilled in the art. A handful of images of different types e.g. photos, game type textures, text, etc., can be used as training data.

In order to make a hardware implementation of the intensity table less expensive, the intensity modifiers of a set can be forced to be symmetrical, as was discussed above, and/or the intensity modifiers of a given set could be a copy of intensity modifiers of another set modified by a factor, e.g. two.

Table 1 illustrates an example of an intensity table comprising 8 sets of intensity modifiers, with four modifier values in each set, that can be used according to the technology disclosed herein.

TABLE 1

| Set | Codeword | Intensity modifier value | | | |
|---|---|---|---|---|---|
| 1 | $000_{bin}$ | −10 | −3 | 3 | 10 |
| 2 | $001_{bin}$ | −32 | −9 | 9 | 32 |
| 3 | $010_{bin}$ | −48 | −13 | 13 | 48 |
| 4 | $011_{bin}$ | −127 | −41 | 41 | 127 |
| 5 | $100_{bin}$ | −20 | −6 | 6 | 20 |
| 6 | $101_{bin}$ | −64 | −18 | 18 | 64 |
| 7 | $110_{bin}$ | −96 | −26 | 26 | 96 |
| 8 | $111_{bin}$ | −254 | −84 | 84 | 254 |

In Table 1, the intensity modifier sets 5-8 are a copy of sets 1-4 multiplied by a factor of two.

If the intensity table comprises at most 8 different intensity modifier set, the intensity codeword is preferably a 3-bit index ($000_{bin}$-$111_{bin}$) identifying one of the (8) sets, e.g. [−32, −9, 9, 32] for codeword $001_{bin}$, of the table. Due to careful choice of the modifier values in the sets, the entire Table 1 can be reconstructed using only 8 modifier values, and the remaining 24 values could be calculated therefrom.

The technology disclosed herein is, though, not limited to usage of Table 1, but could use other tables with other intensity modifier sets and values. Furthermore, for more or less than 8 sets in a table, the size of the intensity codeword might have to be changed. For example, if the table comprises two (3-4 or more than 8) intensity modifier sets, the intensity codeword size could be limited to one bit (two bits or four (or more) bits). In addition, the number of intensity modifier values per set could differ from four, e.g. five values could be used per set, giving an example of [−32, −9, 0, 9, 32]. The intensity values of the sets in the table could be determined using several different types of images as training data, as was discussed above. However, if only a specific image type is to be encoded, the modifier values could be determined using training data corresponding to that image type, i.e. giving an intensity table dedicated for a specific image type. It could also be possible to have an intensity table with intensity modifier values adapted for a specific image. In these cases, i.e. table dedicated for image or image type, it might be necessary to include the intensity modifier values of the table in the compressed file of encoded image blocks or otherwise associate them therewith.

In addition, the intensity codeword does not have to be a pointer to an intensity modifier set in a table, but could actually be an intensity modifier set itself, e.g. comprises two modifier values, such as 9 and 32, and where the other modifier values, such as −9 and −32, can be determined from these two values. However, in such a case, the intensity codeword will probably be comparatively larger than if it is a set index. Alternatively, the intensity modifier sets employed could be according to [−ka, −a, a, ka] or [−$k_1$a, −$k_2$a, $k_2$a, $k_1$a], where a is 0 or a positive integer and k, $k_1$ and $k_2$ are multiplication factors. In such a case, the intensity codeword only need to include the value a and all the remaining three values can be calculated therefrom if k or $k_1$ and $k_2$ are pre-defined multiplication factors.

Once the intensity codeword is provided in step S11, a next step S12 selects intensity indices or representations for the image elements in the image block. Each such intensity index is associated with one intensity modifier value from the intensity modifier set provided in step S11. In other words, the intensity index allows identification of which intensity modifier of the set to use for a specific image element of the block.

In the case of an intensity modifier set comprising four modifier values, such as −32, −9, 9, 32, the intensity index could be a 2-bit sequence identifying one of these four values.

Step S12 is preferably repeated for all image elements in the image block. The result of the compression of steps S10 to S12 is a compressed image block or more precisely a compressed (encoded) representation of the image block. Such a compressed block representation 700A is illustrated in FIG. 4A. The representation 700A comprises the color codeword (first codeword) 720A, the intensity codeword (second codeword) 730A and a sequence or bitmap 740A of intensity indices (preferably one intensity index for each image element in the block). In addition, the compressed block representation 700A includes the mode index 710A associated with the first compression mode. Note that the mutual order of the mode index 710A, color codeword 720A, intensity codeword 730A and intensity index sequence 740A of the compressed image block 700A may differ from what is illustrated in the figure. Note also that the codewords and index sequence do not need to be laid out consecutively.

If the image block comprises eight image elements (see e.g. FIGS. 2A and 2B) and each intensity index is 2 bits, the size of the sequence 740A is 16 bits. Furthermore, assume that corresponding sizes of the color 720A and intensity 730A codewords are 12 and 3 bits, respectively, and the mode index 710A is 1 bit. The total size of the encoded representation 700A of the image block is then 32 bits and a compression rate of 4 bpp is obtained. This small (32-bit) size of the representation 700A is well adapted for thin clients, such as mobile units, which typically have memory busses of 16 or 32 bits. As a result, only one or at worst two memory accesses are then needed to read out the encoded representation 700A.

Continuing with the second compression mode in FIG. 3, step S13 determines a first and a second color codeword that are representations of the colors of the image elements in the image block. In a preferred implementation, the first and second color codeword are representations of a first and a second portion of the image elements in the block, respectively. As was briefly noted above, the second compression mode is in particular effective for compressing image blocks, the image elements of which are distributed into two clusters in the color space. The first color codeword can then efficiently represent the color of the first image element cluster, whereas the second codeword represent the second cluster. In addition, assume that the intensity table used in the first compression mode only contains non-zero intensity modifiers. In such a case, the first compression mode is not particularly suitable for compressing an image block where the color codeword exactly represents a desired color for all image elements. Since all intensity modifiers have a non-zero value, this desired color cannot be obtained during decoding when a modifier value should be added, for each image element, to the color representation. However, in the second compression mode at least one of the two color codewords can exactly represent this desired color, allowing a more accurate compressed representation of the image block.

Color indices pointing to or associated with one of the two color codewords are selected in next step S14. In a first embodiment, each image element in the block is associated with a respective color index. However, in a preferred example embodiment, resulting a smaller total size of the compressed block representation, a subset of the image elements in the block is associated with a pre-defined color codeword selected from the first or second codeword. As a consequence, no selection or assignment of color index has to be performed for this (these) image element(s). For example, the first (last) image element could always be associated with the first (or second) color codeword. The index sequence does then not need to contain a color index for this first (last) image element. As a consequence, the sequence will only contain 7 color indices in the case of an image block with totally 8 image elements. It is anticipated by the technology disclosed herein that more than one image element could be pre-associated with a color codeword.

The step S14 is preferably repeated for all image elements of the block for which a color index should be generated. The result of the compression of steps S13 and S14 is a compressed image block representation. Such a compressed block representation 700B is illustrated in FIG. 4B. The representation 700B comprises the first color codeword (first codeword) 720B, the second color codeword (second codeword) 730B and a sequence or bitmap 740B of color indices (preferably one intensity index for only a subset of the image element in the block). In addition, the compressed block representation 700B includes the mode index 710B associated with the second compression mode. Note that the mutual order of the mode index 710B, first color codeword 720B, second color codeword 730B and color index sequence 740B of the compressed image block 700B may differ from what is illustrated in the figure. Note also that the codewords and index sequence do not need to be laid out consecutively.

If the image block comprises eight image elements (see e.g. FIGS. 2A and 2B) and each color index is 1 bits and one of the image elements in the block is always associated with a pre-defined color codeword, the size of the sequence 740B is 7 bits. Furthermore, assume that the corresponding sizes of the first 720B and second 730B color codeword 12 bits each, and the mode index 710B is 1 bit. The total size of the compressed representation 700B of the image block is then 32 bits and a compression rate of 4 bpp is obtained.

In the discussion above, the two color codewords are both of the same size (12 bits each). However, the technology disclosed herein is not limited thereto. For example, the first color codeword could be represented at a higher resolution than the second codeword, so that it contains more bits than the second color codeword. In such a case, the first color codeword could have a size of 15 (18) bits, whereas the second color codeword is only 9 (6) bits.

In an alternative embodiment that utilizes differently sized color codewords, the first color codeword may be encoded as a normal color, with e.g. 5 bits for each of the three color components. The second color codeword, on the other hand, may be coded (e.g. using 9 bits) as a function of the first color codeword. The 9 bits may be used to specify which function to use. For example, the first 3 bits of the 9-bit second color codeword may specify how the color components of the first codeword should be swapped in order to obtain the color components of the second codeword. If the first color codeword is $R_1, G_1, B_1$, the second color could be obtained from Table 2 below, depending upon the first 3 bits:

TABLE 2

| Three MSBs[†] of second codeword | Resulting color $R_2, G_2, B_2$ |
|---|---|
| $000_{bin}$ | $G_1, R_1, B_1$ |
| $001_{bin}$ | $B_1, G_1, R_1$ |
| $010_{bin}$ | $R_1, B_1, G_1$ |
| $011_{bin}$ | $B_1, R_1, G_1$ |
| $100_{bin}$ | $G_1, B_1, R_1$ |
| $101_{bin}$ | $R_1, G_1, B_1$ |

[†]Most Significant Bits

The remaining 6 bits of the second codeword can be used to fine tune the resulting color representing. For example, two bits could be used to tune the red component according to Table 3:

TABLE 3

| 2-bit red tuner | Resulting red component |
|---|---|
| $00_{bin}$ | $R_2 - 16$ |
| $01_{bin}$ | $R_2 - 4$ |
| $10_{bin}$ | $R_2 + 4$ |
| $11_{bin}$ | $R_2 + 16$ |

The same procedure is then preferably performed for the green and blue color component, respectively.

The reason why such a coding may have better effect than just coding the colors separately is that the first and second colors are not independent. We know that the second color is most often not on the line $$\begin{bmatrix} R \\ G \\ B \end{bmatrix} = \begin{bmatrix} 1 \\ 1 \\ 1 \end{bmatrix} t + \begin{bmatrix} R_1 \\ G_1 \\ B_1 \end{bmatrix}, \qquad (1)$$

where $t \in [-\infty, \infty]$, because if it was, the first compression mode would be superior and, thus, selected. If $R_1$ is different from $G_1$ and $B_1$ and $G_1$ is different from $B_1$, none of the colors in Table 2 except the last table entry $R_1, G_1, B1$ are on the line (1). This means that the shuffling function represented by Table 2 is a cheap way of producing a color that is not on the line (1) and that may be a good candidate for the second color representation.

In the embodiment described above, a swapping function was chosen to produce the un-tuned (basic) color for the second codeword from the first codeword. However, the technology disclosed herein is not limited to usage of such a swapping function. For example, an inversion function could alternatively be employed according to Table 4.

TABLE 4

| Two MSBs of second codeword | Resulting color $R_2, G_2, B_2$ |
| --- | --- |
| $00_{bin}$ | $255 - R_1, G_1, B_1$ |
| $01_{bin}$ | $R_1, 255 - G_1, B_1$ |
| $10_{bin}$ | $R_1, G_1, 255 - B_1$ |
| $11_{bin}$ | $R_1, G_1, B_1$ |

Alternatively, a "setting to zero" function could be employed as illustrated by Table 5.

TABLE 5

| Three MSBs of second codeword | Resulting color $R_2, G_2, B_2$ |
| --- | --- |
| $000_{bin}$ | $0, G_1, B_1$ |
| $001_{bin}$ | $R_1, 0, B_1$ |
| $010_{bin}$ | $R_1, G_1, 0$ |
| $011_{bin}$ | $0, 0, B_1$ |
| $100_{bin}$ | $0, G_1, 0$ |
| $101_{bin}$ | $R_1, 0, 0$ |
| $110_{bin}$ | $0, 0, 0$ |
| $111_{bin}$ | $R_1, G_1, B_1$ |

In a further alternative, a "setting to 255" function could be used according to Table 6.

TABLE 6

| Three MSBs of second codeword | Resulting color $R_2, G_2, B_2$ |
| --- | --- |
| $000_{bin}$ | $255, G_1, B_1$ |
| $001_{bin}$ | $R_1, 255, B_1$ |
| $010_{bin}$ | $R_1, G_1, 255$ |
| $011_{bin}$ | $255, 255, B_1$ |
| $100_{bin}$ | $255, G_1, 155$ |
| $101_{bin}$ | $R_1, 255, 255$ |
| $110_{bin}$ | $255, 255, 255$ |
| $111_{bin}$ | $R_1, G_1, B_1$ |

In Table 4 and 6, it is assumed that the maximum color component value is 255, i.e. having totally 256 color levels. If a different maximum number of color levels L are used, the value 255 is preferably exchanged by L-1 in Table 4 and 6.

In a further embodiment a closest neighbor function according to Table 7 is used.

TABLE 7

| Three MSBs of second codeword | Resulting color $R_2, G_2, B_2$ |
| --- | --- |
| $000_{bin}$ | $R_1 + 8, G_1, B_1$ |
| $001_{bin}$ | $R_1, G_1 + 8, B_1$ |
| $010_{bin}$ | $R_1, G_1, B_1 + 8$ |
| $011_{bin}$ | $R_1 + 8, G_1 + 8, B_1$ |
| $100_{bin}$ | $R_1 + 8, G_1, B_1 + 8$ |

TABLE 7-continued

| Three MSBs of second codeword | Resulting color $R_2, G_2, B_2$ |
| --- | --- |
| $101_{bin}$ | $R_1, G_1 + 8, B_1 + 8$ |
| $110_{bin}$ | $R_1 + 8, G_1 + 8, B_1 + 8$ |
| $111_{bin}$ | $R_1, G_1, B_1$ |

In Table 7 the constant 8 was chosen because it is the smallest specifiable number when using 15 bits as is done for the first color. However, this principle can be extended to any non-zero constant.

Furthermore, two or more functions can be applied in series to the first color (codeword) in order to obtain the second color. For example, the swapping function in Table 2 could be followed by the setting to zero function of Table 5. Assume that the first color representation generated using the first color codeword is (173, 0, 57) and the second color codeword is $010\ 000_{bin}$. The second color representation is obtained by first swapping according to the three MSB ($010_{bin}$), resulting in (173, 57, 0), see Table 2. Then this swapped color is processed according to the setting to zero function (Table 5) using the bit pattern $000_{bin}$, resulting in the second color representation of (0, 57, 0).

A person skilled in the art understands that any function or combination of functions can be used, as long as it does not always produce colors on the line (1) and preferably is simple to implement.

If all the image elements in the image block are associated with a same color codeword, the bits used for the remaining color codeword will not be used for anything useful. These bits could then simply be nonsense. However, they could alternatively be used for something more useful that will enhance the quality of the compressed image block. For example, these extra bits may be used for modifying or boosting the color codeword indexed by the image elements. Assume that the first color codeword is according to $(R_0R_1R_2R_3G_0G_1G_2G_3B_0B_1B_2B_3)$ and the second color codeword is according to $(r_0r_1r_2r_3g_0g_1g_2g_3b_0b_1b_2b_3)$, where $R_x, r_x, G_x, g_x, B_x, b_x$ independently is $0_{bin}$ or $1_{bin}$, x=0...3. By then, during decoding, combining these two codewords into $(R_0R_1R_2R_3r_0r_1r_2r_3G_0G_1G_2G_3g_0g_1g_2g_3B_0B_1B_2B_3b_0b_1b_2b_3)$ a 24-bit representation of the colors of the image elements in the block is obtained.

The method then continues from step S12 or step S14 in FIG. 3 to step S4 in FIG. 1.

Test experiments of the compressing method run according to FIG. 1 have been conducted on different types of images. In most of these test experiments, a vast majority (>90%) of the image blocks were compressed according to the first compression mode. This further indicates that the first mode could be regarded as a main compression mode that gives the highest quality in terms of PSNR for most image blocks and that the second mode could be regarded as an auxiliary compression mode used for those blocks where the first mode gives a poor result. In the above-discussed preferred implementation of the two modes, both modes have access to 31 "useful" bits that can be used for compressing the image blocks. A remaining single bit is then used as mode index. In an alternative example embodiment, a different kind of mode index than a single bit is used. That mode index will then enable a different amount of allocated "useful" bits to the two compression modes but still preserves the total size of the compressed image block.

In this embodiment, the single mode bit is omitted, which frees 1 bit. This bit can then be added to the intensity codeword, which results in a preferred intensity codeword size of 4 bits. As a consequence, an intensity table with potentially 16 modifier sets could be used. However, preferably only 12 out of these 16 table entries will be used as intensity modifier sets. The remaining 4 table entries are mode indices signaling the second compression mode. Table 8 is a non-limiting example of such a table:

TABLE 8

| Codeword | Intensity modifier value/Mode index | | | |
|---|---|---|---|---|
| $0000_{bin}$ | Second compression mode | | | |
| $0001_{bin}$† | −12 | −4 | 4 | 12 |
| $0010_{bin}$† | −31 | −6 | 6 | 31 |
| $0011_{bin}$† | −34 | −12 | 12 | 34 |
| $0100_{bin}$ | Second compression mode | | | |
| $0101_{bin}$† | −47 | −19 | 19 | 47 |
| $0110_{bin}$† | −80 | −28 | 28 | 80 |
| $0111_{bin}$† | −127 | −42 | 42 | 127 |
| $1000_{bin}$ | Second compression mode | | | |
| $1001_{bin}$† | −24 | −8 | 8 | 24 |
| $1010_{bin}$† | −62 | −12 | 12 | 62 |
| $1011_{bin}$† | −68 | −24 | 24 | 68 |
| $1100_{bin}$ | Second compression mode | | | |
| $1101_{bin}$† | −94 | −38 | 38 | 94 |
| $1110_{bin}$† | −160 | −56 | 56 | 160 |
| $1111_{bin}$† | −254 | −84 | 84 | 254 |

†Combined intensity codeword and "mode 1"-specific mode index

Thus, a 4-bit word of $0001_{bin}$-$0011_{bin}$, $0101_{bin}$-$0111_{bin}$, $1001_{bin}$-$1011_{bin}$ or $1101_{bin}$-$1111_{bin}$ represents an intensity codeword and that the first compression mode should be used. Thus, in this first compression mode the mode index and the intensity codeword share the same four bits. In other words, if the intensity index is associated with one of the twelve possible intensity modifier sets in Table 8, the first compression mode should be or has been used for the current block. Note also that the whole Table 8 can be construed from 12 intensity modifier values, implying that the remaining 36 modifier values can be calculated therefrom.

In this embodiment, the modified intensity table can be used for enhancing the luminance resolution of the image block in the first mode. At first sight, this resolution boost of the first mode comes at the cost of three less useful bits (four less useful bits due to the mode index, $0000_{bin}$, $01000_{bin}$, $1000_{bin}$ or $1100_{bin}$, but one extra useful bit due to omitting the single mode bit) for the second compression mode. However, by careful investigation of the proposed "mode 2"-specific mode indices, we notice that the two LSBs are identical ($00_{bin}$) for all of these mode indices. As a consequence, the two MSBs can be employed for representing "useful" data, e.g. color codeword or color index data. As a consequence, the extra 1-bit boost for the first compression mode only comes at the cost of one less useful bit for the second compression mode. This single bit is preferably taken from the second color codeword, more preferably from the blue color component of the second codeword.

Compared to the compressed block representation compressed illustrated in FIG. 4A, a block representation compressed according to this embodiment of the first mode preferably includes a 12-bit color codeword, a 4-bit combined intensity codeword and mode index, a 16-bit intensity index sequence. Correspondingly, a block representation compressed according to this embodiment of the second mode preferably includes (compare with FIG. 4B) a 12-bit first color codeword, a 11-bit second color codeword, a 7-bit color index sequence and a 4-bit mode index, of which two bits a shared with e.g. the first codeword, second codeword or index sequence. In both these two modes, the total sizes of the compressed block representations are preferably 32 bits.

In the discussion above, the 4-bit words of $0000_{bin}$, $0100_{bin}$, $1000_{bin}$ and $1100_{bin}$ have been used as mode index for signaling the second compression mode. This should, though, merely be seen as an illustrative example and the technology disclosed herein, is not limited thereto. Actually, the four 4-bit words of XYZZ, ZZXY, XZZY, where X, Y, Z independently is $0_{bin}$ or $1_{bin}$, could represent the second compression mode. It is anticipated by the technology disclosed herein that some other number of "mode 2" -specific mode indices besides four, e.g. one, two or three mode indices, could be employed. In such a case, the Table 8 would include more (or less) than 12 entries comprising intensity modifier values and dedicated for the first mode.

In the preceding discussion, the technology disclosed herein has mainly been discussed with reference to an image block comprising eight image elements, e.g. an image block of 1×8, 8×1, 2×4, 4×2 or 2×2×2 image elements, where the latter example is applicable for 3D images. However, the technology disclosed herein is not limited thereto. The technology disclosed herein can in general be applicable to an image block of a size $2^m \times 2^n$ image elements, where m, n independently is zero or a positive integer, preferably selected from 0, 1, 2, 3. Two image blocks could also share information and be compressed and decompressed as one bigger unit. For example, two 2×4 (or 4×2) block can be combined into a 4×4 unit. In the first compression mode, these two image blocks could share the mode index and the intensity codeword, which basically releases 4 bits that can be used e.g. for increasing the resolution of the green color component and the intensity codeword. In such a case, the 4×4 unit could be compressed into a compressed unit comprising e.g. a 1-bit mode index, a 13-bit color codeword for the first image block, a 13-bit color codeword for the second image block, a 5-bit intensity codeword and a 32-bit intensity index sequence. Optionally, the compressed unit could also include a 16-bit (or 15-bit) color index sequence, allowing a selection of one of the two codewords for all the image elements in the unit (one image element could have a pre-defined association with one of the codewords). Correspondingly, in the second compression mode, the compressed unit preferably comprises a 1-bit mode index, a 12-bit first color codeword for the first image block, a 12-bit second color codeword for the first image block, a 12-bit first color codeword for the second image block, a 12-bit second color codeword for the second image block, and a 15-bit color index sequence.

In the encoding embodiment discussed above in connection with FIG. 1, the choice of compression mode and compressed block version to use for the current image block is performed after the generation of the codewords and index sequences for the two modes. This most often results in the most appropriate choice of compression mode for each image block in the image. This "best choice" of mode comes at the cost of compressing the image block into two different compressed representations. Thus, extra processor power and computational efforts are required compared to only generating one compressed representation.

In an alternative example embodiment, the selection of compression mode can be made during the compression procedure, i.e. during the generation of codewords and/or index sequences. As a consequence, two complete block representations do not have to be generated before the selection is performed. As a result, less computational efforts could be used, although possibly leading to non-optimal mode selection for some image blocks.

FIG. 5 illustrates a further embodiment of the encoding method, where the selection of compression mode is performed in advance of the actual processing (compression) of an image block. As a consequence, only a single compressed block representation has to be generated per image block. The method starts in S20, which corresponds to step S1 in FIG. 1 and is not discussed further. In a next step S21, the compression mode, according to which the current block should be compressed or encoded, is selected. This early mode selection is preferably made based on an investigation of the properties of the image elements in the block. In a preferred embodiment, the selection is, at least partly, based on the distribution of the colors of the image elements in the relevant color space, which is discussed in more detail below. Once a suitable compression mode has been selected in step S21, a mode index associated with this compression mode is provided in step S22.

The remaining two steps S23 and S24 correspond to the steps S2 and S3 of FIG. 1 with one big exception. In S2 and S3 two sets, each including two codewords and an index sequence, were determined, one such set for each compression mode. However, since the compression mode to use for the block already has been determined in this embodiment, only one set of two codewords and an index sequence are determined in steps S23 and S24. Briefly turning to FIGS. 3 and 5, if the index mode provided in step S22 represents the first compression mode, the two steps S23 and S24 are preferably performed according to the three leftmost steps S10 to S12 in FIG. 3. However, if the index mode instead represents the second compression mode, the steps S23 and S24 are preferably performed according to the rightmost steps S13 and S14 in FIG. 3.

The resulting encoded or compressed block representation, thus, includes the mode index, the first and second codeword and the index sequence according to the selected compression mode.

The steps S21 to S24 are preferably repeated for all image blocks provided during the decomposing of step S20 (schematically illustrated by line L2). The result is then a sequence or file of compressed image blocks. The method then ends.

The encoded image could then be provided to a memory for storage therein until a subsequent rendering, e.g. display, of the image. Furthermore, the encoded image could be provided as a signal of encoded block representations to a transmitter for (wireless or wired) transmission to another unit.

FIG. 6 illustrates an embodiment of the steps of generating color codeword, intensity codeword and intensity index sequence (S10 to S12) of FIG. 3 and the steps of determining codewords and providing index sequence for the first compression mode (S2-S3 and S23-S24) of FIGS. 1 and 5. In step S30, an average color of the image elements in the image block is determined. In the following, it is assumed that the color of an image element of an image is represented by 24 bits of RGB color, i.e. 8 bits of the red component, 8 bits or the green component and 8 bits of the blue component. However, the technology disclosed herein is not limited to this particular example, but can be applicable to any color representation of image elements. The average color $(\overline{R}, \overline{G}, \overline{B})$ is then determined as:

$$\overline{R} = \frac{1}{N}\sum_{i=1}^{N} R_i \quad (2)$$

-continued $$\overline{G} = \frac{1}{N}\sum_{i=1}^{N} G_i$$

$$\overline{B} = \frac{1}{N}\sum_{i=1}^{N} B_i,$$

where $R_i$, $G_i$, $B_i$, are the R, G, B component of image element i and N is the total number of image elements in the image block.

Once the average color $(\overline{R}, \overline{G}, \overline{B})$ is determined in step S30, a next step S31 quantizes the average color. The average color is preferably quantized into a 12-bit sequence (color codeword). In other words, each 8-bit average component is quantized into a 4-bit average component. For example, if the average color $\overline{R}, \overline{G}, \overline{B}$ is calculated to:

$$\begin{bmatrix} 178 \\ 88 \\ 21 \end{bmatrix} = \begin{bmatrix} B2 \\ 58 \\ 15 \end{bmatrix}_{hex} = \begin{bmatrix} 10110010 \\ 01011000 \\ 00010101 \end{bmatrix}_{bin},$$

a 4-bit quantized version $(\hat{R}, \hat{G}, \hat{B})$ could be generated from:

$$\begin{bmatrix} 170 \\ 85 \\ 17 \end{bmatrix} = \begin{bmatrix} AA \\ 55 \\ 11 \end{bmatrix}_{hex} = \begin{bmatrix} 10101010 \\ 01010101 \\ 00010001 \end{bmatrix}_{bin},$$

i.e. $[A, 5, 1]_{hex} = [1010, 0101, 0001]_{bin}$ could be used as a (12-bit) color codeword.

Step S32 investigates the different intensity modifier sets of the table and the different modifier values of the sets. A next step S33 calculates an error value for each such modifier set and modifier value test. Based on these error values, a modifier set and intensity modifier values of the set that results in a smallest error value is selected in the step S33. This is described in more detail below.

In this first compression mode, the image block can be encoded using one of three different examples denoted simple encoding, -exhaustive encoding and combined quantization, which are briefly discussed below.

Simple Encoding

In order to encode an image block according to this example of the first compression mode, basically a color codeword and a correct intensity modifier set are selected. Once this is done, encoding of each image element in the image block is done by trying all the four intensity modifiers of the set and calculating the error. In some applications, a more accurate modifier selection and higher encoding quality is obtained by employing a weighted error value, such as:

$$\epsilon^2 = w_R(\hat{R}+\alpha-R)^2 + w_G(\hat{G}+\alpha-G)^2 + w_B(\hat{B}+\alpha-B)^2, \quad (3)$$

where the original (24-bit) color of an image element is (R, G, B), $(\hat{R}, \hat{G}, \hat{B})$ denotes the color codeword (quantized average color, 12 bits), the chosen modifier set is $[-a, -b, b, a]$ and $\alpha \in [-a, -b, b, a]$, $w_R, w_G, w_B$ are different weights for the color components. In addition, $w_G$ is preferably larger than $w_R$ and $w_B$. For example, $$w_R = \frac{5}{16}, w_G = \frac{9}{16}, \text{ and } w_B = \frac{2}{16},$$

or $w_R=0.299$, $w_G=0.587$ and $w_B=0.114$.

A corresponding (weighted) error value is calculated for all combinations of modifiers and sets, and the combination of modifiers and set that result in the smallest error is selected. In this simple encoding, an average color of eight image elements in the block, quantized to 4 bits per color component, is used as color codeword. The correct intensity modifier set is then chosen by exhaustive search, i.e. all the 8 sets in an intensity table, e.g. Table 1, are tried, and the set that minimizes the error value is selected. This requires 8×4=32 evaluations per image element. If weights are $$w_R = \frac{5}{16}, w_G = \frac{9}{16}, \text{ and } w_B = \frac{2}{16},$$

integer arithmetics can be used and the encoding becomes fast. For this selection of weights, encoding of an image of 64×64 pixels (image elements) using the simple encoding should take less than 100 ms, e.g. around 30 ms, on a 1.2 GHz PC laptop.

Exhaustive Encoding

In the simple encoding example described above, the quantized average color was simply used as a representation (color codeword) of the colors of the image elements in the image block. In this exhaustive encoding example of the first compression mode, both the colors and the intensity modifier sets (including the modifier values) are chosen, i.e. every possible combination is tried. For a given image element, a further iteration through all 12 bits of color is added in addition to the previous iteration of all 3 bits of intensity modifier set and the 2 bits of intensity index, which together gives $2^{17}$ steps. Encoding an image of 64×64 pixels takes a few minutes using the same PC laptop as for the simple compression. Although this might be far too long for run-time applications, it is not prohibitive for off-line encoding.

Combined Quantization

As for the simple encoding example, this example of the first compression mode starts with a (24-bit) average color ($\bar{R}$, $\bar{G}$, $\bar{B}$), but the color components of this average color are quantized together with the intensity components, i.e. selection of intensity modifier sets and values.

If $R_{low}$ and $R_{high}$ denote the 4-bit quantization levels or values that are directly below and above $\bar{R}$, respectively so that $R_{low} \leq \bar{R} \leq R_{high}$. The task is then to choose $\hat{R}$ as either $R_{low}$ or $R_{high}$. The same is true for the green and blue components.

Firstly, the error value is calculated with $(\hat{R}, \hat{G}, \hat{B})=(R_{low}, G_{low}, B_{low})$:

$$\epsilon^2=(R_{low}\alpha-\bar{R})^2+(G_{low}+\alpha-\bar{G})^2+(B_{low}+\alpha-\bar{B})^2. \quad (4)$$

This can be simplified into:

$$\epsilon^2=(\delta_R+\alpha)^2+(\delta_G+\alpha)^2+(\delta_B+\alpha)^2, \quad (5)$$

where $\delta_R=R_{low}-\bar{R}$, $\delta_G=G_{low}-\bar{G}$ and $\delta_B=B_{low}-\bar{B}$. Further assume that $\alpha$ (the intensity modifier) can be chosen freely, i.e. is equal to the optimal $$\alpha = -\frac{\delta_R+\delta_G+\delta_B}{3}.$$

Inserting this optimal $\alpha$ into equation (5) gives after simplification:

$$\epsilon^2 = \frac{2}{3}(\delta_R^2 + \delta_G^2 + \delta_B^2 - \delta_R\delta_G - \delta_R\delta_B - \delta_G\delta_B) = \frac{2}{3}\xi, \quad (6)$$

where $\xi$ is the expression in the brackets.

However, if the higher value is instead chosen for the red component, i.e. $(\hat{R}, \hat{G}, \hat{B})=(R_{high}, G_{low}, B_{low})$, and the fact that $R_{high}-\bar{R}=17+\delta_R$ is used, equation (5) can be rewritten as:

$$\epsilon^2=((\delta_R+17)+\alpha)^2+(\delta_G+\alpha)^2+(\delta_B+\alpha)^2. \quad (7)$$

This expression can further be simplified, by inserting the optimal $$\alpha = -\frac{\delta_R+17+\delta_G+\delta_B}{3}$$

for this case, into:

$$\epsilon^2 = \frac{2}{3}(\delta_R^2 + \delta_G^2 + \delta_B^2 - \delta_R\delta_G - \delta_R\delta_B - \delta_G\delta_B + \quad (8)$$
$$17^2 + 17 \times 2\delta_R - \delta_G - \delta_B)$$
$$= \frac{2}{3}(\xi + 17[17 + 2\delta_R - \delta_G - \delta_B]).$$

In order to determine which of these two quantized colors $(R_{low}, G_{low}, B_{low})$ or $(R_{high}, G_{low}, B_{low})$ is the best, i.e. gives the smallest error value, the extra expression in the straight brackets of equation (8) is investigated. In other words, if $17+2\delta_R-\delta_G-\delta_B<0$, $(R_{high}, G_{low}, B_{low})$ should be chosen, else $(R_{low}, G_{low}, B_{low})$ is chosen (in the case $17+2\delta_R-\delta_G-\delta_B=0$, either codeword could be chosen). This procedure is then repeated for all possible combinations of low and high quantization for the three color components, i.e. for all neighboring quantized colors of the average color. The result is presented in Table 9 below.

TABLE 9

| Color codeword | Error value $\epsilon^2$ |
|---|---|
| $R_{low}, G_{low}, B_{low}$ | $\frac{2}{3}\xi$ |
| $R_{high}, G_{low}, B_{low}$ | $\frac{2}{3}(\xi + 17[17 + 2\delta_R - \delta_G - \delta_B])$ |
| $R_{low}, G_{high}, B_{low}$ | $\frac{2}{3}(\xi + 17[17 + 2\delta_G - \delta_R - \delta_B])$ |
| $R_{low}, G_{low}, B_{high}$ | $\frac{2}{3}(\xi + 17[17 + 2\delta_B - \delta_R - \delta_G])$ |
| $R_{low}, G_{high}, B_{high}$ | $\frac{2}{3}(\xi + 17[17 - 2\delta_R + \delta_G + \delta_B])$ |

TABLE 9-continued

| Color codeword | Error value $\epsilon^2$ |
| --- | --- |
| $R_{high}, G_{low}, B_{high}$ | $\frac{2}{3}(\xi + 17[17 - 2\delta_G + \delta_R + \delta_B])$ |
| $R_{high}, G_{high}, B_{low}$ | $\frac{2}{3}(\xi + 17[17 - 2\delta_B + \delta_R + \delta_G])$ |
| $R_{high}, G_{high}, B_{high}$ | $\frac{2}{3}\xi$ |

Note that $\xi$ is not required to be explicity calculated, only the expressions (error representations) in the straight brackets in Table 9 have to be calculated in order to select the quantization levels (color codeword) to use. Further note that color codeword ($R_{low}, G_{low}, B_{low}$) and ($R_{high}, G_{high}, B_{high}$) give the same error value. This is under the assumption that any $\alpha$ (intensity modifier value) can be reached. In reality, however, $\alpha$ is limited to the intensity modifier values of the used modifier set(s), e.g. the modifier values of Table 1. According to Table 1, smaller modifier values ($\alpha$) can be specified with greater accuracy than larger values, which means that it is better to choose ($R_{high}, G_{high}, B_{high}$) rather than ($R_{low}, G_{low}, B_{low}$) if ($\bar{R}, \bar{G}, \bar{B}$) is closer to ($R_{high}, G_{high}, B_{high}$) than ($R_{low}, G_{low}, B_{low}$), and vice versa. The total encoding time was not measurably changed compared with the simple encoding, i.e. an image of 64×64 pixels should still be compressed in less than 100 ms.

FIG. 7 illustrates an embodiment of the steps of generating first and second color codeword, and color index sequence (S13 and S14) of FIG. 3 and the codeword determining step for the second compression mode (S2-S3 and S23-S24) of FIGS. 1 and 5. In step S40, an average color or center of gravity of the image elements in the image block is determined. This step corresponds to step S30 in FIG. 6 and is not further discussed. In a next step S41, an optimal line passing through the average color point in the color space is computed. This optimal line can be determined using principal component analysis, which is well known to the person skilled in the art. Briefly, this optimal line is chosen as a straight line in the color space that passes through the average color point such that it minimizes the "moment of inertia" (the mean square error). For example, the direction of this optimal line can be computed by calculating the tensor inertia T as follows:

$$T = \sum_{i=1}^{N} \begin{bmatrix} G_i^2 + B_i^2 & -R_i G_i & -R_i B_i \\ -R_i G_i & R_i^2 + B_i^2 & -G_i B_i \\ -R_i B_i & -G_i B_i & R_i^2 + G_i^2 \end{bmatrix}, \quad (9)$$

where $R_i, G_i, B_i$ represent $R_0^i - \bar{R}, G_0^i - \bar{G}, B_0^i - \bar{B}$ and $R_0^i, G_0^i, B_0^i$ are the original color components of image element i, ($\bar{R}, \bar{G}, \bar{B}$) is the average color point and N is the total number of image element in the block. The eigenvector of the tensor T with the smallest eigenvalue is calculated using conventional methods. The eigenvector direction along with the average color point defines the axis that minimizes the moment of inertia. This axis is used as the optimal line.

In a next step S42, two points on this line are selected, quantized and used as color codewords. In a first embodiment, the variance of the projections of the image element colors onto the optimal line is calculated. The two points on the line that are at a distance of about three quarters of the variance from the average color point are identified. The color components of the two selected points (one on either side of the average color point along the line) are then quantized, preferably, into 4 bits each, resulting in a total size of 3×4=12 bits per point. These quantized values are then used as color codewords.

In an alternative example embodiment, the color values of the image elements in the block are projected onto the optimal line. The two projected points on the line (one on either side of the average color point) that have the largest distance to the average color point are identified. Since these two points represent the extreme values, we should preferably select color values positioned between the average point and the extreme color as codewords. For example, a color point on the line positioned at e.g. about 0.5 or 0.75 of the distance between the average point and an extreme point could be quantized as above and used as color codeword.

In a further embodiment, the color values of the image elements in the block are projected onto the optimal line as discussed above. These projected values on the line are then grouped or parted into two clusters. In conducting the search for the optimal partition, the two clusters for the 8 points projected onto the optimal line that minimize the error associated with the selection are identified. The two quantized (12-bit) colors that best represent the two clusters are determined and used as color codewords.

In still another embodiment, a search of suitable points along the optimal line is performed. In such a case, small (pre-defined) steps are taken along the line in both directions starting from the average point. The points that are associated with the smallest error value are then selected, quantized and used as color codewords. In this embodiment, the search could be continued until a maximum number of steps have been taken, a maximum distance from the average point has been reached or a local minimum has been found.

FIG. 8 illustrates another embodiment of the steps of generating first and second color codeword, and color index sequence (S13 and S14) of FIG. 3 and the codeword determining step for the second compression mode (S2-S3 and S23-S24) of FIGS. 1 and 5. In step S50, the color values of the image elements in the block are quantized, preferably into 12-bit quantized color values. An exhaustive search is then performed among the quantized color values. The result of this search is two quantized color values (note though that these two color values could be equal) that minimizes the error value associated with employing these two selected color values as color codewords for the block. The two optimal quantized color values can then be used directly as color codewords. However, in the optional step S51 an exhaustive search of suitable codewords is performed among the color points within a pre-defined distance from each selected color value. For example, assume that the quantized color of the first selected image element is $R_1G_1B_1$ and the corresponding quantized color of the second selected image element is $R_2G_2B_2$. As a consequence, the first color codeword is searched among the color values $R_1 - X_R \leq R \leq R_1 + X_R$, $G_1 - X_G \leq G \leq G_1 + X_G$, $B_1 - X_B \leq B \leq B_1 + X_B$, where $X_{R,G,B}$ is the maximum searchable distance in the R,G,B-direction. The second color codeword is searched in a similar manner around the color point $R_2G_2B_2$. The optimal quantized color values (in the sense of minimizing an associated error value) found in the search are used as color codeword.

Figure 9:
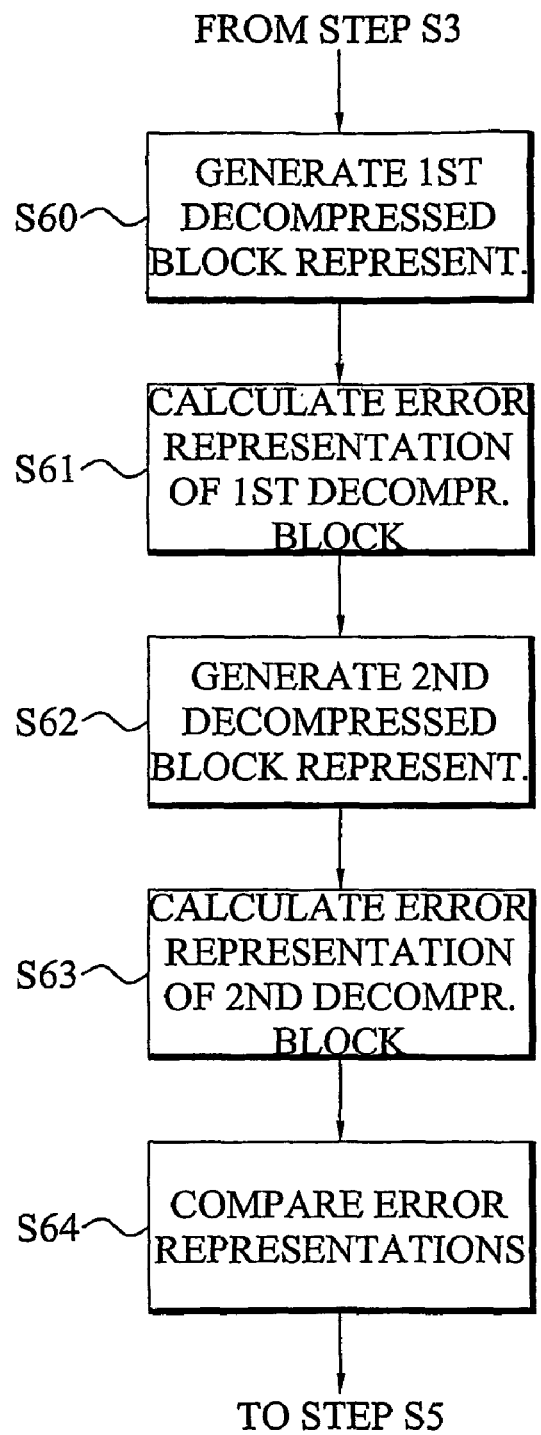
FIG. 9 is a flow diagram illustrating the compression mode selecting step of FIG. 1 in more detail.

FIG. 9 is a flow diagram illustrating the compression mode selection step of FIG. 1 in more detail. The method continues from step S3 in FIG. 1. In a next step S60, a first decompressed or decoded representation of the image block is generated using the image block representation compressed according to the first compression mode. Briefly in this step, a color representation for the image elements in the block is generated based on the color codeword. An intensity modifier set is selected e.g. from Table 1, based on the intensity codeword. The intensity of image elements is then modified utilizing an intensity modifier selected from the modifier set based on the intensity index sequence. In a next step S61, an error value indicative of representing the original image block with this first decompressed block representation is calculated. Let $R_0^i$ ($G_0^i$, $B_0^i$) denote the value of the red (green, blue) color component of image element i in the original (unprocessed) image block and $R_d^i$ ($G_d^i$, $B_d^i$) denote the corresponding resulting red (green, blue) color component of image element i in the first decompressed block representation. This error value can then be calculated as:

$$\varepsilon^2 = \sum_{i=1}^{N} \left[ (R_d^i - R_0^i)^2 + (G_d^i - G_0^i)^2 + (B_d^i - B_0^i)^2 \right], \quad (10)$$

where N is the total number of image elements in the block. Optionally component-specific weights $w_R$, $w_G$, $w_B$ could be used in equation (10).

In step S62, a corresponding second decompressed representation of the image block is generated using the image block representation compressed according to the second compression mode. Briefly in this step, a color representation is generated for each image element based on a color codeword selected from the first or second codeword using the index sequence, or the pre-defined associated color codeword. In a next step S63, an error value indicative of representing the original image block with this second decompressed block representation is calculated. This step S63 is performed similar to step S61 and is not further discussed. In the step S64, the two determined error values are compared. If the first (second) error value is the smallest, the first (second) compression mode is selected for the current block and the first (second) compressed image block version is used as encoded representation of the block. The method then continues to step S5 of FIG. 1.

FIG. 10 is a flow diagram illustrating the compression mode selecting step of FIG. 5 in more detail. The method continues from step S20 in FIG. 5. In a next step S70, the color distribution of the image elements of the block in the color space is investigated. As has been mentioned in the foregoing, the two compression modes are adapted for somewhat different image blocks. For example, the first compression mode is highly suitable for usage when the colors of the image elements in the block are on or at least close to the line:

$$\begin{bmatrix} R \\ G \\ B \end{bmatrix} = \begin{bmatrix} 1 \\ 1 \\ 1 \end{bmatrix} t + \begin{bmatrix} \overline{R} \\ \overline{G} \\ \overline{B} \end{bmatrix}, \quad (11)$$

where $\overline{RGB}$ is the average color of the image elements in the block and t∈[−∞, ∞]. Thus, the first compression mode is suitable for compressing image blocks, the image elements of which are on or close to the line passing the average color point and has a slope of one in the RG-, RB- and GB-planes. However, the second compression mode is more suitable if the image block includes image elements having color values far from the above-identified line, and in particular grouped into two clusters.

In a next step S71, the compression mode to use for the current block is determined based on this distribution. For example, a vector (v1) parallel with the optimal line discussed in connection with the second compression mode in FIG. 7 can be compared to a vector (v2) parallel with the above-discussed line (11) for the first compression mode. If the angle (θ) between the two vectors are smaller than a threshold angle (φ), i.e.

$$\theta = \arccos\left(\frac{v1 \cdot v2}{|v1||v2|}\right) < \varphi, \quad (12)$$

the first compression mode is selected, otherwise the second mode is selected. The method continues to step S22 of FIG. 5.

Image Decoding

Figure 11:
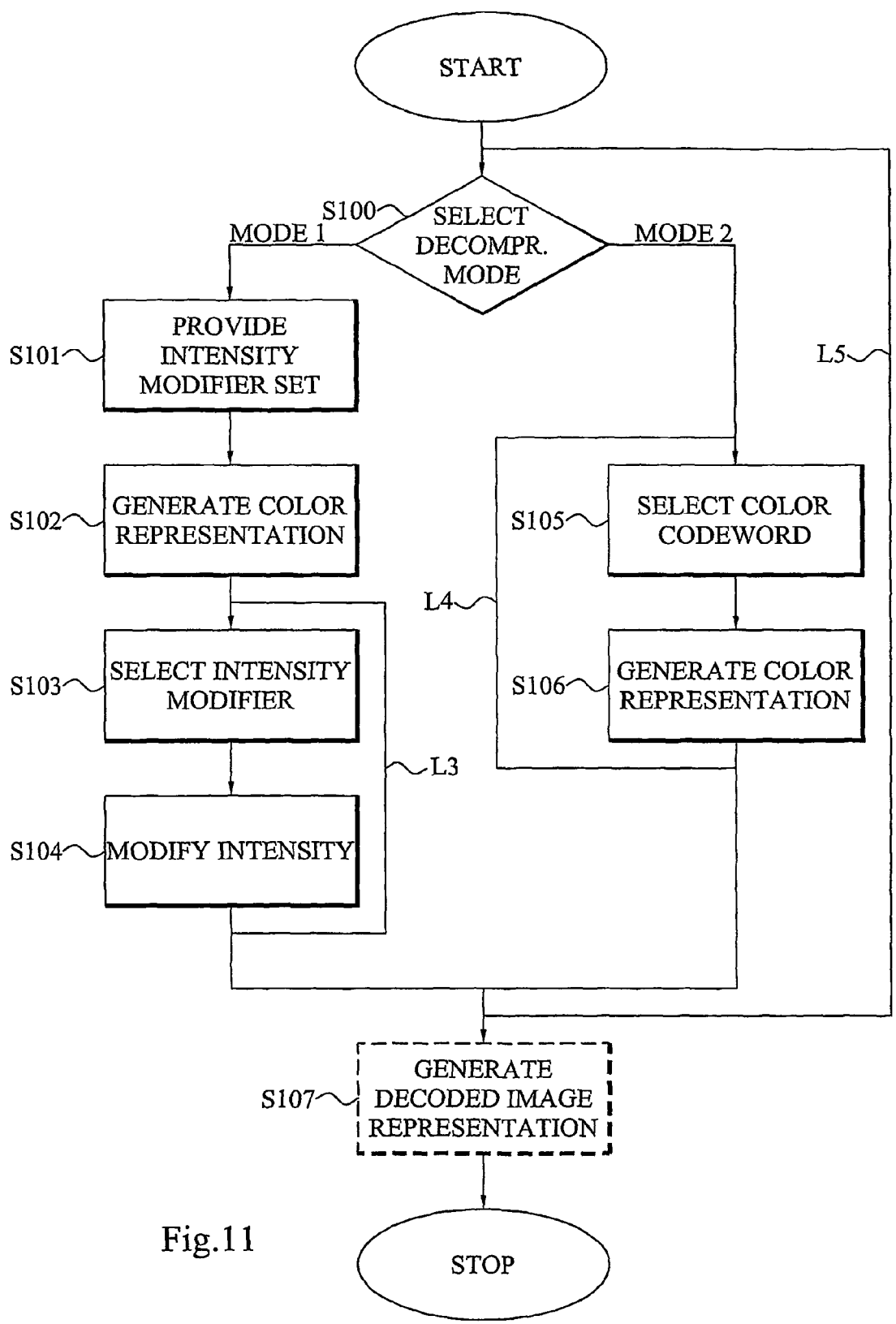
FIG. 11 is a flow diagram illustrating an image decoding method according to an example embodiment.

FIG. 11 illustrates a flow diagram of a method of decoding an encoded image or encoded version of an original image according to the an example embodiment. The encoded image basically comprises several compressed or encoded representations of image blocks, such as representations 700A and/or 700B of FIGS. 4A and 4B. These compressed block representations are preferably generated by the image encoding method discussed above in connection with FIG. 1 or 5.

The method generally starts by identifying compressed image block(s) to decompress. It could be possible that all compressed image blocks of an encoded image should be decompressed to generate a decoded representation of the original image. Alternatively, only a portion of the original image is to be accessed. As a consequence, only a selected number of image blocks have to be decompressed (or more precisely, a selected amount of image elements of certain image blocks have to be decompressed or decoded).

Once the correct compressed image block is identified, step S100 selects which decompression mode out of two possible decompression mode to employ for the current block. This mode selection is preferably based on the mode index included in the compressed block representation.

Starting with the case where the mode index represents a first decompression mode. Step 101 provides an intensity modifier set. This modifier set is provided based on the intensity codeword in the compressed block representation. This set provision is preferably performed by identifing, by means of the intensity codeword, an intensity modifier set from a table, e.g. Table 1, comprising multiple modifier sets. However, in some applications it might be possible that the intensity codeword itself comprises the modifier set and that no table look-up is required.

In a next step S102, a color representation is generated for at least one of the image elements of the image block (i.e. for the image element(s) that should be decompressed). This color generation is performed based on the color codeword in the compressed block representation. In step S103, the intensity modifier to use for the image element that should be decompressed is selected. The modifier value is selected from the modifier set provided in step S101 based on the intensity index associated with the image element and found in the index sequence of the compressed block representation. Once the correct intensity modifier value is selected in step S103, the intensity of the image element is modified or modulated with this value in step S104. Intensity modification according to the technology disclosed herein refers to modifying, e.g. adding or multiplying, all color components of the color representation by the (possibly weighted) intensity modifier value, and optionally clamping.

Steps S103 and S104 could be performed for several image elements in the image block (schematically illustrated by line L3). It is anticipated by the technology disclosed herein that in some applications, only a single image element is decompressed from a specific image block, multiple image elements of a specific image block are decoded and/or all the image elements of a specific block are decompressed.

However, if the mode index instead represents the second decompression mode, the method continues from step S100 to step S105. In this step S105, a color codeword is selected from the first or second color codeword using a color index associated with the relevant image element and found in the index sequence. However, if the relevant image element belongs to the subset of image elements that does not have an associated color index but instead has a pre-defined associated color codeword, that pre-defined color codeword is identified in step S105. In a next step S106, a color representation for the image element is generated using the selected or pre-defined color codeword similar to step S102. Steps S105 and S106 could be performed for several image elements in the image block (schematically illustrated by line L4).

Alternatively, in particular when decompressing multiple image elements in a compressed block representation, a first color representation is generated using the first color codeword and a second corresponding color representation is generated using the second color codeword or a combination of the first and second codeword. The selection for the image elements is then performed among the first and second color representation using the color indices, or one of the first or second color representation is pre-associated with one or some of the image elements in the block.

If all image elements in the compressed block representation are associated with a same color codeword or representation, i.e. all color indices are equal, the second color codeword could be used for modifying the first color codeword as was mentioned above. Generally, a color representation is determined from a color codeword by expanding the 12-bit codeword into a 24-bit color representation. This color expansion may be realized by multiplying the quantized 4-bit color components by 17 for an implementation with 256 different colors $$\left(\frac{256-1}{16-1} = 17\right).$$

This is the same thing as replicating the 4-bit pattern to the first (top) and last (lower) 4 bits of the expanded 8-bit color word. However, in the special case of equal-color indices, the color representation can be generated by multiplexing the two color codewords, instead of expanding a single color codeword.

Steps S100 to S104 or S106 are then preferably repeated for all image blocks that comprise image elements that should be decoded (schematically illustrated by line L5). This means that the loop of steps S100 to S104 or S106 could be performed once, but most often several times for different compressed image blocks and/or several times for a specific compressed image block.

In the optional step S107, a decoded representation of the original image, or a portion thereof, is generated based on the decompressed image elements and blocks. Note that in some applications, several image elements have to be decompressed in order to render a single pixel, texel or voxel of the decoded representation. For example, during trilinear interpolation, eight image elements are decompressed and for bilinear interpolation the corresponding number is four image elements, which is well known to the person skilled in the art. The method then ends.

FIG. 12 illustrates an embodiment of steps S101 and S102 of FIG. 11 in more detail. In step S110, a correct intensity modifier set is identified and selected from the intensity table by means of the intensity codeword. If the intensity modifier set stored in the intensity table comprises a first sub-set of modifier values, e.g. [a, b], a second sub-set of intensity modifier values can be determined from the values of the first sub-set, e.g. [−a, −b]. In a next step S111, the quantized color of the color codeword, preferably 12 bits, is expanded or extended into, preferably, 24 bits. For the case with a RGB color, each quantized 4-bit color component of the color codeword is then expanded into an 8-bit color component. This color expansion may be realized by multiplying the quantized 4-bit color components by 17 for an implementation with 256 different colors $$\left(\frac{256-1}{16-1} = 17\right).$$

This is the same thing as replicating the 4-bit pattern to the first (top) and last (lower) 4 bits of the expanded 8-bit color word. In other words, a 4-bit color component of $1010_{bin}$ is expanded into $1010\,1010_{bin}$. In step S112, the expanded color is then assigned to the image elements of the image block, which are to be decoded. The method then continues to step S103 of FIG. 11.

FIG. 13 illustrates an embodiment of step S104 in FIG. 11 in more detail. In step S120, the identified and selected intensity modifier value is added to the expanded color. Thus, this modifier value is added to all components (all three for a RGB color) of the color for the image element. This could be implemented as a simple addition of the modifier value to all color components. However, in some applications it could be preferred to weight the modifier value before adding it to the components. In such a case, different weights can be employed for the different color components. In an alternative embodiment, another type of modification than a simple addition could be employed, e.g. multiplication, XOR or another modification. In such a case, the same modulation is performed to all components of the expanded color using one and the same intensity modifier value, although this value may be differently weighted for the components. In a next step S121, the resulting intensity-modified color component values are clamped between a minimum color threshold and a maximum color threshold. For example, if after adding the (possibly weighted) intensity modifier value to a color component, the resulting value is smaller than the minimum threshold, the value is clamped to the value of this threshold. Correspondingly, if the resulting value is larger than the maximum threshold, the value of the threshold should instead be used for that component. A non-limiting example of a minimum and maximum threshold is 0 and 255, respectively, for the case with 256 levels for each color component. The method then continues to step S100 or S107 of FIG. 11.

Decoding an encoded image block will further be illustrated by three examples herebelow. In the first example, a compressed block representation as illustrated in FIG. 4A, an image block as illustrated in FIG. 2A and an intensity table according to Table 1 are assumed and in the second and third example the compressed block representation is according to FIG. 4B.

Decoding Example 1

The compressed representation of the image block is according to 0 1010 0101 0001 011 11 01 10 00 10 01 00 00$_{bin}$, where the bit 0 is the mode index, bit 1-4 is the red component of the color codeword, bit 5-8 is the green component of the color codeword, bit 9-12 is the blue component of the color codeword, bit 13-15 is the intensity codeword and bit 16-31 is the sequence of intensity indices.

The color codeword is decoded (expanded) to generate the color representation of the image block. Each color component in the color codeword is in 4 bits, but is expanded to 8 bits by multiplying by 17, which is the same thing as replicating the 4-bit pattern to both the top and lower 4 bits of the 8-bit word:

| | | |
|---|---|---|
| Red: | 1010 1010$_{bin}$ ⇔ | 170 |
| Green: | 0101 0101$_{bin}$ ⇔ | 85 |
| Blue: | 0001 0001$_{bin}$ ⇔ | 17 |

This expanded color is assigned to the image elements of the image blocks giving:

| | | | |
|---|---|---|---|
| (170, 85, 17) | (170, 85, 17) | (170, 85, 17) | (170, 85, 17) |
| (170, 85, 17) | (170, 85, 17) | (170, 85, 17) | (170, 85, 17) |

The correct intensity modifier set to use is selected from Table 1 based on the intensity codeword. As is seen in Table 1 an intensity codeword of 011$_{bin}$ corresponds to intensity modifiers [−127, −41, 41, 127].

The sequence of intensity indices enables identification of which of these four modifier values to use for the different image element according to:

$$\begin{bmatrix} 11_{bin} \\ 10_{bin} \\ 00_{bin} \\ 01_{bin} \end{bmatrix} = \begin{bmatrix} -127 \\ -41 \\ 41 \\ 127 \end{bmatrix}$$

The first intensity index is 11$_{bin}$, which means that the first intensity modifier value, −127, should be added to all three components of the first image element:

$$\begin{bmatrix} 170 \\ 85 \\ 17 \end{bmatrix} + \begin{bmatrix} -127 \\ -127 \\ -127 \end{bmatrix} = \begin{bmatrix} 43 \\ -42 \\ -110 \end{bmatrix}$$

The resulting components are clamped between 0 and 255, thus giving (43, 0, 0). The partly decoded image block is now according to:

| | | | |
|---|---|---|---|
| (43, 0, 0) | (170, 85, 17) | (170, 85, 17) | (170, 85, 17) |
| (170, 85, 17) | (170, 85, 17) | (170, 85, 17) | (170, 85, 17) |

For the next image element, the intensity index is 01$_{bin}$, i.e. the intensity modifier 127 should be added to all three color components. The result after clamping is (255, 212, 144). Repeating this procedure for all image elements in the block would create the final decoded image block shown below:

| | | | |
|---|---|---|---|
| (43, 0, 0) | (255, 212, 144) | (129, 44, 0) | (211, 126, 58) |
| (129, 44, 0) | (255, 212, 144) | (211, 126, 58) | (211, 126, 58) |

Decoding Example 2

The compressed representation of the image block is according to 1 1010 0101 0001 1110 0001 1001 1 0 0 0 1 1 0$_{bin}$, where the bit 0 is the mode index, bit 1-4 is the red component of the first color codeword, bit 5-8 is the green component of the first color codeword, bit 9-12 is the blue component of the first color codeword, bit 13-16 is the red component of the second color codeword, bit 17-20 is the green component of the second color codeword, bit 21-24 is the blue component of the second color codeword and bit 25-31 is the sequence of color indices for a subset of the image elements of the block. In this example, it is further assumed that the first image element in the block is pre-associated with the first color codeword and that does not have a corresponding color index.

The color codewords can be decoded (expanded) to generate the two color representations. Each color component in the color codewords is in 4 bits, but is expanded to 8 bits:

| First color representation | | | Second color representation | |
|---|---|---|---|---|
| Red: | 1010 1010$_{bin}$ ⇔ 170 | Red | 1110 1110$_{bin}$ ⇔ 238 |
| Green: | 0101 0101$_{bin}$ ⇔ 85 | Green | 0001 0001$_{bin}$ ⇔ 17 |
| Blue: | 0001 0001$_{bin}$ ⇔ 17 | Blue: | 1001 1001$_{bin}$ ⇔ 153 |

The first image element is in this example always associated with the first color codeword and representation and is therefore assigned the color (170, 85, 17). The color index for the second image element is 1$_{bin}$, implying that the second color representation (238, 17, 153) should be assigned to this image element. Continuing this procedure results in the final decompressed block representation:

| | | | |
|---|---|---|---|
| (170, 85, 17) | (238, 17, 153) | (170, 85, 17) | (170, 85, 17) |
| (170, 85, 17) | (238, 17, 153) | (238, 17, 153) | (170, 85, 17) |

Decoding Example 3

The compressed representation of the image block is according to 1 10101 00000 00111 010 01 10 11 1 0 0 0 1 1 0$_{bin}$, where the bit 0 is the mode index, bit 1-5 is the red component of the first color codeword, bit 6-10 is the green component of the first color codeword, bit 11-15 is the blue component of the first color codeword, bit 16-24 is the second color codeword and bit 25-31 is the sequence of color indices for a subset of the image elements of the block. In this decoding example, it is further assumed that the first image element in the block is pre-associated with the first color codeword and that does not have a corresponding color index. Furthermore, in this decoding example, the second color representation is calculated by inputting the first color representation (or alternatively the first color codeword) in a shuffling function according to Table 2 and then fine-tuning the resulting color components according to Table 3.

The first color codeword is expanded into a 24-bit color representation:

| | | |
|---|---|---|
| Red: | $10101101_{bin}$ | $\Leftrightarrow 173$ |
| Green: | $00000000_{bin}$ | $\Leftrightarrow 0$ |
| Blue: | $00111001_{bin}$ | $\Leftrightarrow 57$ |

The three MSB ($010_{bin}$) of the second color codeword is used to see what shuffling of the data that should be used in the present example. In Table 2, $010_{bin}$ indicates that the resulting second color, before tuning, should be $R_1, B_1, G_1$, which will, thus, be 173, 57, 0. Thereafter, the respective color components are tuned. The red-specific tuning index is $01_{bin}$. As a consequence, the red component should be tuned by subtracting 4 (see Table 3), giving 173−4=169. Correspondingly, the green-specific tuning index is $10_{bin}$, implying that the greed component should be increased by 4, i.e. 57+4=61. Finally, the tuning index for the blue component is $11_{bin}$. In Table 3, this corresponds to adding 16 to the blue component, resulting in 0+16=16. The resulting two color representations for these codewords are then (173, 0, 57) and (169, 61, 19). These two color components are then assigned to the different image elements similar to the decoding example 2 above, resulting in the decoded image block representation:

| | | | |
|---|---|---|---|
| (173, 0, 57) | (169, 61, 19) | (173, 0, 57) | (173, 0, 57) |
| (173, 0, 57) | (169, 61, 19) | (169, 61, 19) | (173, 0, 57) |

Implementation Discussion

The image encoding (image block encoding) and image decoding (image block decoding) scheme according to the technology disclosed herein could be provided in a general data processing system, e.g. in a user terminal or other unit configured for processing and/or rendering images. Such a terminal could be a computer. However, the technology disclosed herein is well adapted for thin clients, such as Personal Digital Assistance (PDA), mobile units and telephones. Such terminals are typically characterized by limited memory capacity and memory bandwidth, and are powered by batteries, i.e. also limited power supply. Since both encoding and decoding according to the technology disclosed herein can be implemented very easily in hardware, software or a combination of hardware and software and an encoded image block preferably only has a maximum size of 32 bits, the technology disclosed herein could with advantage be applied to a thin client.

Image Processing Terminal

FIG. 14 illustrates an image processing terminal 100 represented by a mobile unit. However, the technology disclosed herein is not limited to mobile units by could be implemented in other terminals and data processing units. Only means and elements in the mobile unit 100 directly involved in the technology disclosed herein are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (compressed image blocks) according to the technology disclosed herein. Due to the small total size of image blocks (32 bits) and high compression rate (4 bpp), image data can efficiently be stored in the memory 140 also in cases with a mobile unit 100 with limited memory capacity.

An image encoder 210 according to the technology disclosed herein is provided in the mobile unit 100. This encoder 210 is configured for encoding an image or texture into an encoded representation of the image (or texture). As was discussed above, such an encoded representation comprises a sequence or file of multiple compressed image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130. A big advantage of the cheap (in terms of complexity) and fast decompression of the technology disclosed herein is that compressed image blocks may, at least temporarily, be stored in the cache for fast and easy access. This is further facilitated by the high compression rate, which allows six times as much image block data to be simultaneously stored in the cache compared to uncompressed (RGB888) block data.

If the (memory) bus 150 has a maximal bandwidth of 32 bits, a single memory access is required to fetch or read out an encoded image representation of the technology disclosed herein from the memory 140. If however, the bus 150 has larger bandwidth capacity, e.g. 64 bits or even 128 bits, multiple encoded image representations could be fetched in a single memory access. For example assume a 64-bit bus 150 and image block size according to FIG. 2. If the image blocks are according to FIG. 2A and are piled "on top of each other", or if they are according to FIG. 2B and a piled "side by side", an image block together with the subsequent image block in the memory 140 will form a 4×4 square of image elements. However, if the blocks of FIG. 2A (FIG. 2B) are positioned "side by side" ("on top of each other"), the image block together with the following block will form a 2×8 box. A 4×4 square is more preferred, since the probability of finding a desired image element in the 4×4 square is larger than for the 2×8box, if some form of texture caching system is employed.

An image decoder 220 according to an example embodiment is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 220 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly transmitted between terminals using radio transmitter and receiver. Alternatively, other techniques for distributing images and encoded image representations between terminals could be employed, such as IR-techniques using IR ports, Bluetooth and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Encoder

FIG. 15 illustrates a block diagram of an embodiment of an image encoder 210 according to the technology disclosed herein. The encoder 210 typically comprises an image decomposer 215 for decomposing or dividing an input image into several image blocks. The decomposer 215 is preferably configured for decomposing the image into image blocks comprising eight image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). Such an image block representation comprises two codewords and a sequence of image element associated indices. The overall size of the block representation is much smaller than the corresponding size of the uncoded image block. The block encoder 300 is preferably configured for processing (encoding) each image block from the decomposer 215 sequentially.

The block encoder 300 preferably comprises, or has access to, an intensity table 500 comprising multiple intensity modifier sets. The modifier sets of the table 500 are used in the first compression mode for the generation of the intensity, and possibly color, codeword. The intensity table 500 could be arranged in the block encoder 300 or elsewhere in the image encoder 210.

The image encoder 210 could comprise a single intensity table 500. Alternatively, several different tables could be arranged in the encoder 210, where the intensity modifiers of the tables are adapted for different image types or a table could be adapted for a specific image. However, in order to lower the complexity of the encoder 210 and corresponding decoder, a single intensity table 500 generated with training data from several different image types is preferably employed in the encoder 210.

The units 215 and 300 of the image encoder 210 may be provided as software, hardware or a combination thereof. The units 215, 300 and 500 may be implemented together in the image encoder 210. Alternatively, a distributed implementation is also possible with some of the units provided elsewhere in the user terminal.

FIG. 16 illustrates a block diagram of another embodiment of the image encoder 210. This image encoder 210 comprises an image decomposer 215 as the embodiment of FIG. 15, which is not further discussed. However, the encoder 210 includes multiple (M, where M is a positive integer larger than one) block encoders 300-1 to 300-M. Each such block encoder 300-1 to 300-M basically corresponds to the block encoder of the image encoder in FIG. 15. By providing multiple block encoders 300-1 to 300-M in the image encoder 210, multiple image blocks from the decomposer 215 may be processed (encoded) in parallel, which reduces the total image encoding time. Alternatively, a first subset of the block encoders 300-1 to 300-P could be operated for compressing an image block according to the first compression mode, whereas a remaining subset of the encoders 300-P+1 to 300-M are operated according to the second compression mode (1<P<M). In cases of selecting a compression mode for a block after compression, a first block encoder could compress the image block according to the first compression mode simultaneously as a second encoder compresses the same block according to the second mode. The resulting two compressed block versions can then be compared. In such a case, the image encoder preferably includes a mode selector that receives the two block versions determines which of them most accurately represents the original block.

Each block encoder 300-1 to 300-M could comprise an intensity table 500. The intensity tables 500 in the different encoders 300-1 to 300-M could all include identical intensity modifier values. Alternatively, different block encoders could include different tables. In such a case, one or several block encoders could be adapted for a certain image type, whereas other block encoders are adapted for other image type(s). In an alternative implementation, a single intensity table 500 is arranged in the image encoder 210 and connected to all block encoders 300-1 to 300-M.

The units 215 and 300-1 to 300-M of the image encoder 210 may be provided as software, hardware or a combination thereof. The units 215, 300-1 to 300-M and 500 may be implemented together in the image encoder 210. Alternatively, a distributed implementation is also possible with some of the units provided elsewhere in the user terminal.

FIG. 17 illustrates a block diagram of an embodiment of a block encoder 300 such as the block encoder of the image encoder in Fig. 15 or one of the block encoders in the image encoder of FIG. 16. The encoder 300 includes a compression mode selector 310 that selects a compression mode for a current image block. This selector 310 could be operated for selecting the compression mode based on input color values of the image elements in the block (i.e. before compressing the block). Alternatively, the mode selection is performed in response to input error representations or input compressed block representations (i.e. after or during compressing the block). Information of the selected mode is forwarded to a mode index provider 320 that generates a mode index for the block that represents the compression mode selected by the mode selector 310. In some applications, the functionalities of these two units 310, 320 can be combined into a single mode unit.

A codeword generator 330 is provided in the encoder 320 for generating a first and second codeword for the image block. The generator 330 could be configured for generating the codewords according to both the compressions mode, i.e. generate a color and intensity codeword and a first and second codeword. However, in cases the mode selector 310 already has selected a compression mode to use for the current block, information of this selected mode is preferably input to the codeword generator 330. As a consequence, only the two codewords of this pre-selected mode has to be generated for the block.

The encoder 300 further includes an index sequence provider 340 that generates a sequence of image element associated indices. As for the codeword generator 330, this sequence provider 340 could be operated for generating two index sequence versions (one intensity index sequence and one color index sequence) representing the two compression modes. However, if the mode selector 310 already has done a mode selection, the sequence provider 340 is responsive to a mode signal from the mode selector 310. As a consequence, the provider 340 then only generates a single index sequence per image block. The index sequence could include one (color or intensity) index for each image element in the block. In a preferred example embodiment, when operating according to the second compression mode, the provider 340 generates a sequence that includes (color) indices for only a subset of the image elements in the block.

The block encoder 300 preferably also includes, or at least has access to an intensity table 500 used by the codeword generator 330 and index sequence provider 340 when operating according to the first compression mode.

The block encoder 300 could optionally comprise an error estimator 350 for estimating error values for the purpose of selection of codewords and image element associated indices for the image block. The choice of codeword and indices that minimizes an associated error value is then selected for the relevant compressed image block version(s). This error estimator 350 can also be operated for determining error values indicative of representing an image block with a block representation compressed according to the first or second mode. These error values are preferably forwarded to the mode selector 310 and used in the mode selection operation.

The units 310 to 350 the block encoder 300 may be provided as software, hardware or a combination thereof. The units 310 to 350 and 500 may be implemented together in the block encoder 300. Alternatively, a distributed implementation is also possible with some of the units provided elsewhere in the image encoder.

FIG. 18 illustrates a block diagram of an embodiment of the codeword generator 330 in FIG. 17. This codeword generator 330 includes a color quantizer 332 that determines at least one color representation of the colors of the image elements in the image block and quantizes this (these) color representation(s). When operating in the first mode, a single color representation, preferably a 24-bit average color of the image element, is determined and is subsequently quantized to a 12-bit color codeword. However, when operating in the second mode two (24-bit) color representations are determined and quantized into a first and second (12-bit) color codeword.

An intensity quantizer 336 is provided in the codeword generator 330 for identifying an intensity modifier set to use for a current image block. The quantizer 336 preferably comprises a modifier set selector 337 for selecting this modifier set from an associated intensity table 500. The quantizer 336 then generates an intensity codeword that is associated with the selected modifier set.

The units 332, 336 and 337 of the codeword generator 320 may be provided as software, hardware or a combination thereof. The units 332, 336 and 337 may be implemented together in the codeword generator 320. Alternatively, a distributed implementation is also possible with some of the units provided elsewhere in the block encoder.

A preferred implementation of a color quantizer 332 according to the technology disclosed herein is illustrated in the block diagram of FIG. 19. The quantizer 332 comprises means 331 configured for determining an average of the colors of the image elements in the image block. This average color is preferably a RGB color, but could be any other color format used in image processing.

This determined average color is then provided to quantizing means 335, which could directly quantize the average color. The quantizer 335 is preferably configured for quantizing a 24-bit average RGB color from the color averager 331 into a 12-bit RGB color codeword. Alternatively, the quantizer 335 or color averager 331 determines an optimal line passing through the average color point in the (RGB-) color space. Two points on this line are then selected and quantized by the quantizer 335 into two (12-bit RGB) color codewords. The point to select can be determined according to the discussion above in connection with FIG. 7.

An optional image element selector 333 could be provided in the color quantizer 332 for performing an exhaustive search among the image elements in the block to find two quantized color values that can be used for determining the first and second color codeword according to the second compression mode. These two selected color values can be directly provided to the quantizer 335 for generation of the two color codewords. Alternatively, a new exhaustive search is performed by the selector 333 around the two selected quantized color values to find to optimal quantized colors that can be used as codewords.

The quantizer 335 could, when operating in the second compression mode, generate a second codeword that includes one or multiple function indices and/or component-specific tuning indices, as was discussed above in connection with Table 2 to 7. In such a case, the first color codeword includes data that preferably enables direct generation of the first color representation. The second color representation can then be generated using the first color representation or the first color codeword as data input in one or multiple functions represented by the second codeword, optionally followed by color component tuning as represented by the second codeword.

The units 331, 333 and 335 of the color quantizer 330 may be provided as software, hardware or a combination thereof. The units 331, 333 and 335 may be implemented together in the color quantizer 330. Alternatively, a distributed implementation is also possible with some of the units provided elsewhere in the codeword generator.

FIG. 20 illustrates a block diagram of an embodiment of the compression mode selector 310 in FIG. 17. The selector 310 generates a measure indicative of an image quality representation (e.g. error representation) associated with compressing the image block according to the first mode and a corresponding measure for the second mode. In an alternative implementation, these measures are determined by other units in the block encoder and provided to the selector 310. In a preferred implementation, the first measure is an error representation indicative of representing the image block as a sequence of the color codeword, the intensity codeword and the intensity index sequence. The second measure is correspondingly an error representation indicative of representing the image block as a sequence of two color codewords and a color index sequence. A selecting unit 314 then selects the compression mode being associated with the smallest error representation.

The units 312 and 314 of the mode selector 310 may be provided as software, hardware or a combination thereof. The units 312 and 314 may be implemented together in the mode selector 310. Alternatively, a distributed implementation is also possible with some of the units provided elsewhere in the block encoder.

Decoder

FIG. 21 illustrates a block diagram of an example embodiment of an image decoder 220. The image decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of a compressed image block having the desired image element(s) is then computed based on the input information. This computed address is preferably dependent upon the image-element (pixel, texel or voxel) coordinates within an image. Using the address, the block selector 222 identifies the encoded image block from the memory or a cache. This identified encoded image block is then fetched from the storage and provided to the block decoder 400.

The (random) access to image elements of an image block advantageously enables selective fetching and decoding of only those portions of an image that are needed without having to parse the bitstream from start. Furthermore, the image can be decoded in any order the data is required. For example, in texture mapping only portions of the texture may be required and these portions will generally be required in a non-sequential order. Thus, the image decoding of the technology disclosed herein can with advantage by applied to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 generates a decompressed representation of the image element(s) in the block. This decoded representation is preferably an S-bit color, where S is the number of bits per image element in the original image, e.g. a 24-bit RGB color. The block decoder 400 preferably comprises an intensity table 500 that is used during the decoding procedure. Alternatively, this intensity table 500 could be provided elsewhere in the image decoder 220. Usage of different intensity tables for different image types, discussed above in connection to FIG. 15, also applies to the image decoder 220.

An optional image composer 224 could be provided in the decoder 220. This composer receives the decoded image elements from the block decoder 400 and composes them to generate a pixel, texel or voxel that can be rendered or displayed on a screen. The composer 224 could require several input image elements to generate a single pixel, texel or voxel. This image composer 224 could alternatively be provided in the graphic system.

The units 222, 224 and 400 of the image decoder 220 may be provided as software, hardware or a combination thereof. The units 222, 224, 400 and 500 may be implemented together in the image decoder 220. Alternatively, a distributed implementation is also possible with some of the units provided elsewhere in the user terminal.

FIG. 22 illustrates a block diagram of another example embodiment of an image decoder 220. The block selector 222 and image composer 224 are similar to corresponding units in FIG. 21 and are not further discussed.

The image decoder 220 comprises multiple block decoders 400-1 to 400-Q (Q is a positive integer larger than one). By having access to multiple block decoders 400-1 to 400-Q, the image decoder 220 can process (decompress) multiple compressed image blocks in parallel. These multiple block decoders 400-1 to 400-Q allow for parallel processing that increases the processing performance and efficiency of the image decoder 220. For example, one decoded image element is generally sufficient for nearest neighbor interpolation, whereas four (eight) image element are need for bilinear (trilinear) interpolation. Each block decoder 400-1 to 400-Q could comprise an intensity table 500 used for the decoding. Alternatively, a single table 500 is arranged in the image decoder 220 and connected to all block decoders 400-1 to 400-Q. The further discussion of using different types of intensity tables, see above in connection with FIG. 16, also applies for the image decoder 220. Similar to the discussion above in connection with FIG. 16, a first subset of the block decoders 400-1 to 400-P could be operated for decompressing a compressed image block according to the first decompression mode, whereas a remaining subset of the decoders 400-P+1 to 400-Q are operated according to the second decompression mode (1<P<Q). In such a case, the image decoder 220 preferably comprises functionality for investigating the compressed image blocks and directing the block traffic to correct block decoder 400-1 to 400-Q.

The units 222, 224 and 400-1 to 400-Q of the image decoder 220 may be provided as software, hardware or a combination thereof. The units 222, 224, 400-1 to 400-Q and 500 may be implemented together in the image decoder 220. Alternatively, a distributed implementation is also possible with some of the units provided elsewhere in the user terminal.

FIG. 23 is an illustration of an example embodiment of a block decoder 400. The block decoder 400 comprises a decompression mode selector 410 that selects a mode, according to which a current compress image block should be decompressed. This mode selection is preferably based on the mode index included in the compressed block representation. The mode selector 410 generates a mode signal or command representing the mode index and the current decompression mode. This mode signal is forwarded to other units in the block decoder 400, which adjust their respective operation in response to the received mode signal.

A color generator 420 generates, when operating in the first decompression mode, a single color representation for all image elements in the image block based on the color codeword. This generator 420 preferably expands the 12-bit color of the codeword into a 24-bit (RGB) color. When operating according to the second mode, a first and second color representation is determined using the first and second color codeword, preferably by expanding the respective codeword into a 24-bit color. When all image elements in the compressed image block is associated with a same color codeword in the second mode, the color generator 420 could be configured for generating a single color representation by possibly utilizing both the color codewords. Generation of a color representation may optionally require both the first and second color codeword, by employing a codeword or color representation function, as was discussed above in connection with Table 2 to 7.

The block decoder 400 further includes means 430 for providing an intensity modifier set from an associated intensity table 500 based on the intensity codeword. This provider 430 could be configured for fetching a first sub-set of modifier values from the intensity table 500 and determining a second sub-set of modifiers based on the first sub-set.

An index selector 440 is arranged for selecting one of the intensity modifier values from the modifier set provided by the means 410 when the mode selector 410 provides a first decompression mode signal. The modifier selector 430 is configured for selecting correct modifier values for the image elements in the compressed image block based on the sequence of intensity indices. However, when the mode command signals the second decompression mode, the index selector selects a color codeword or representation to use for a subset of the image elements using index sequence. As a remaining subset of the image elements have a pre-defined associated color representation (codeword) that representation can simply be assigned to this (these) image element(s) without usage of the index sequence.

The expanded color from the color generator 420 and modifier value from modifier selector 440 are forwarded, when the decoder is operating according to the first mode, to an intensity modulator or modifier 450 that modifies the intensity of the color components of the expanded color with the modifier value. The modifier 450 could use a weighted intensity modifier value, with different weights for the different color components. Furthermore, once the color components have been intensity modified the modifier 450 preferably clamps the components between a maximum and minimum threshold, e.g. between 0 and 255.

The units 410 to 450 of the block decoder 400 may be provided as software, hardware or a combination thereof. The units 410 to 450 and 500 may be implemented together in the block decoder 400. Alternatively, a distributed implementation is also possible with some of the units provided elsewhere in the image decoder.

FIG. 24 schematically illustrates a possible hardware implementation of a block decoder 400 operating according to the first decompression mode. The input to the block decoder 400 is an image block representation 700A comprising a 1-bit mode index 710A, 12-bit color codeword 720A (4 bits for each of the red, green and blue component), a 3-bit intensity codeword 730A and a 16-bit sequence of intensity indices 740A. The index sequence 740A is in this example organized so that the MSBs of the respective 2-bit intensity index for each image element come first followed by the least significant bits (LSBs) of the intensity indices.

The color codeword is provided to the color generator 420, which is realized by three bit extenders 422 to 426. A first bit extender 422 receives the 4-bit red component, a second 424 and third 426 extender receives the 4-bit green and blue component, respectively. The output from respective extender 422 to 426 is an 8-bit color component. This 8-bit component is simply obtained by multiplying the input component with 17, or multiplying the component with 16 and then adding the component. Alternatively, the extenders 422 to 426 could be implemented as bit shifters and OR-gates, e.g. $(1011_{bin}<<4)$ OR $1011_{bin}=1011\ 0000_{bin}$ OR $1011_{bin}=1011\ 1011_{bin}$, where <<4 corresponds to shifting a word four bits to the left.

A modifier selector 440 is implemented as a pair of multiplexors 442, 444. A 3-bit address index is input to the multiplexors 442, 444. Based on the address index, the multiplexors 442, 444 select which of the eight image elements to decode. The multiplexor 442 outputs the MSB of the intensity index for the selected image element, whereas the multiplexor 444 outputs the LSB of the index. The combined 2-bit intensity index is then forwarded to a table look-up 435. This table look-up 435 corresponds to the modifier set provider 430 and intensity table 500 of FIG. 23. Using the input intensity codeword and intensity index the look-up 435 fetches the correct intensity modifier value from one of the modifier sets in the table. This 9-bit signed (positive or negative) modifier value is then provided to an intensity modifier 450. In this hardware implementation the modifier 450 comprises three adders 451 to 453 and three dampers 454 to 456. The modifier value is input to respective adder 451 to 453. A first adder 451 adds the intensity modifier value to the 8-bit red component from bit extender 422. Correspondingly, adder 452 and adder 453 adds the modifier value to the 8-bit green and blue component from bit extender 424 and 426, respectively. In an alternative implementation, the adders 451 to 453 can be replaced with other modifying elements, e.g. multipliers or XOR gates. The outputs from the adders 451 to 453 are forwarded to dampers 454 to 456, which clamp the intensity modified color components between 0 and 255. The output from the dampers 454 to 456 is the decompressed or decoded 24-bit color of the image element.

FIG. 25 schematically illustrates a possible hardware implementation of the bit extenders 422; 424; 426 of FIG. 24. These extenders receive a 4-bit (red, green or blue) color component and output an extended corresponding 8-bit color component. In the output 8-bit color component, the four MSBs constitute the input 4-bit color component, the "fifth MSB" corresponds to the MSB of the input component, the "sixth MSB" corresponds to the "second MSB" of the input component and the remaining two LSBs correspond to the two LSBs of the input component.

FIG. 26 schematically illustrates a possible hardware implementation of the dampers 454; 455; 456 of FIG. 24. The input to the damper 454; 455; 456 is a 10-bit intensity-modified color component value. The eight LSBs of this input value are brought a multiplexor 457. The other input to the multiplexor is the maximum threshold value (255; 8 bits). The multiplexor 457 selects either the 8-bit input value or the maximum threshold value based on the second MSB of the intensity modified color component. In other words, if this second MSB is equal to one, the multiplexor 457 outputs the threshold value, otherwise (the second MSB is equal to zero) the 8-bit input value is output to a second multiplexor 458. This second multiplexor 458 selects the output from the first multiplexor 457 or the minimum threshold value (0; 8 bits) based on the MSB of the color component. If this MSB or sign bit is equal to one, the output from the first multiplexor 457 is negative and the minimum threshold value should be selected by the second multiplexor 458. However, if the sign bit is zero the output from the first multiplexor 457 should also be output from the second multiplexor 458.

FIG. 27 schematically illustrates a possible hardware implementation of the table look-up 435 of FIG. 24. The two LSBs of the 3-bit input intensity codewords are input to two multiplexors 431 and 433 for selecting one 7-bit intensity modifier value from four possible modifier values for each multiplexor 431 and 433. From these 8 intensity modifiers the remaining 24 values could be calculated if employing an intensity table according to Table 1. The selected intensity modifier values from the multiplexors 431 and 433 are input to another multiplexor 434 that selects one of these values based on 1-bit input data (1 bit of the 2-bit intensity representation) from the multiplexors 442 and 444 in FIG. 24. The selected modifier value is then forwarded both to a multiplexor 436 and to negation means 437 that negates the modifier value. Also this negated value is forwarded to the multiplexor 436. This multiplexor 436 selects either the positive 7-bit intensity modifier value or the negated value based on the remaining bit of the intensity representation from the multiplexors 442 and 444 in FIG. 24. The selected (8-bit) modifier value is brought both to a multiplexor 438 and to a bit-shifter 439 that shifts the modifier value one bit to the left, resulting in a 9-bit intensity modifier (corresponds to a multiplication of the value, in base ten, by two). The multiplexor 438 selects either the 8-bit modifier value or the 9-bit modifier value based on the MSB from the intensity codeword. The result from the selection is the 9-bit intensity modifier value, out of the 48 possible modifier values, to use for a specific image element.

FIG. 28 schematically illustrates a corresponding possible hardware implementation of a block decoder 400 operating according to the second decompression mode. The input to the block decoder 400 is an image block representation 700B comprising a 1-bit mode index 710B, 12-bit first 720B and 12-bit second 730B color codeword (4 bits for each of the red, green and blue component) and a 7-bit sequence of color indices 740B.

A (3-bit) address index is input into a multiplexor 446 representing the index selector 440 of FIG. 23. The 1-bit color index associated with the selected image element is forwarded to the color generator 420. Note that in this implementation of the block decoder 400, the first image element in a block is always associated with first color codeword. As a consequence, the multiplexor 446 receives seven input bits representing the color index sequence plus one additional fixed bit ($0_{bin}$) representing the first image element.

The first and second color codeword is provided to the color generator 420, which is realized by three multiplexors 423, 425, 427 and three bit extenders 422, 424, 426. The first multiplexor 423 receives the (4-bit) red color component of the first color codeword and the (4-bit) second color codeword. Correspondingly, the second 425 and third 427 multiplexor receives the (4-bit) green or blue component of the first and second color codeword. The 1-bit color index from the multiplexor 446 of the index selector 440 is provided to respective multiplexor 423, 425, 427 for a selection of which color codeword to employ for the current image element.

A first bit extender 422 receives the 4-bit red component of the selected codeword, a second 424 and third 426 extender receives the selected 4-bit green and blue component, respectively. The operation of the extenders 422, 424, 426 correspond to extenders in FIGS. 24 and 25 and is not further discussed.

The (combined) output from the extenders 422, 424, 426 is the decompressed or decoded 24-bit color of the image element.

FIG. 29 is a corresponding hardware implementation of a block decoder 400 that can operate both according to the first decompression mode and to the second decompression mode, depending on the value of the mode bit in the input compressed block representation 700A, 700B.

Starting with the index selector 440 of FIG. 23. This index selector 440 is realized as three multiplexors 442, 444, 445 and an AND-gate 443. The 16 LSB of the compressed block representation 700A, 700B are input to the selector. When operating according to the first decompression mode, all of these 16 LSBs are forwarded to the two multiplexors 442, 444. Thus, the multiplexor 445 forwards, based on reception of the mode index bit, the MSB of these 16 bits to the multiplexor 442. However, if the mode index bit represents the second decompression mode, the multiplexor 445 outputs $0_{bin}$ (the pre-defined color index) instead of the MSB of these 16 bits.

A 3-bit address index is input to the multiplexors 442, 444. Based on the address index, the multiplexors 442, 444 select which of the eight image elements to decode. The output two bits from the multiplexors 442, 444 are provided to the table look-up 435. The operation of this table look-up 435 was described in connection with FIGS. 24 and 27 and is not repeated herein.

As the table look-up 435 will output an intensity modifier in both decompression modes, but such a modifier will only be used in the first mode, the modifier set provider 430 also includes a multiplexor 432. When this multiplexor 432 receives a mode index bit corresponding to the first mode, it forwards the input intensity modifier. However, in cases the mode index represents the second mode, the multiplexor 432 outputs $0_{bin}$. The multiplexor output is then brought to the intensity modifier 450.

The color generator 420 includes three multiplexors 423, 425, 427 that selects which of two color codewords to use in the second decompression mode and makes sure that only the bits corresponding to the color codeword are forwarded in the first mode. Thus, in this implementation, when $0_{bin}$ is provided to the multiplexors 423, 425, 427 the red, green and blue components of the first color codeword (second mode) or the color codeword (first mode) are forwarded to the three bit extenders 422, 424, 426 of the color generator 420. However, when $1_{bin}$ instead is provided to the multiplexors 423, 425, 427 the red, green and blue components of the second color codeword are forwarded to the three bit extenders 422, 424, 426. The AND-gate 443 receives the mode index and the 1-bit output of the first multiplexor 442 of the index selector 440. Since a mode index of $0_{bin}$ represents the first mode in this implementation, the AND-gate will always output $0_{bin}$ when the decoder receives an image block 700A compressed according to the first mode. However, if the mode index is $1_{bin}$, i.e. represents the second mode, the AND-gate will output $1_{bin}$ in cases where the color index of an image element is $1_{bin}$, i.e. associated with second color codeword, otherwise $0_{bin}$ is output.

The selected red, green and blue components are then brought to the extenders 422, 424, 426 that generates 8-bit red, green and blue color components. These extended components are brought to the intensity modifier 450 that includes three adders 451 to 453 and three dampers 454 to 456. The modifier value from the multiplexor 432 of the modifier set provider 430 is input together with the color components to the adders 451 to 453. Remember that when operating according to the second mode, the multiplexor 432 will output $0_{bin}$, so that the red, green and blue components will pass the adders 451 to 453 without any modification. The remaining operation of the modifier 450 corresponds to what have been discussed with reference to FIGS. 24 and 26.

The output from the dampers 454 to 456 is the decompressed or decoded 24-bit color of the image element.

The hardware solution for the block decoder 400 in FIG. 29 is very simple despite that it can operate according to two decompression modes. The decoder 400 basically comprises only three adders, one negation means, one AND-gate and 18 multiplexors if the bit extenders 422, 424, 426, dampers 444 to 446 and table look-up 435 are implemented according to FIG. 25, 26 and FIG. 27, respectively.

In the foregoing discussion, the technology disclosed herein has been described with reference to image elements with associated color values and, thus, generation of one or multiple color codewords. However, also other image element properties can be encoded in a similar manner to the color property. In such a case, a compressed block representation could include three codewords, of which two represents color codewords or a color codeword and an intensity codeword. The third codeword could then be used for this additional image element property. Furthermore, the index sequence could then, in addition to intensity or color indices, include indices relevant for this third codeword. In an alternative embodiment, this other image element property is used instead of the color, basically replacing the color codeword(s). A typical example of such an additional property is a normal map. Correspondingly to a color codeword, such a normal map or normal (map) codeword typically includes three (vector) components, representing the X direction, Y direction and Z direction. These X, Y, Z components could then be represented by a codeword similar to the R, G, B components of the color codeword. Then, each image element in a normal map encodes which direction that particular point is facing.

It will be understood by a person skilled in the art that various modifications and changes may be made to the present invention without departure from the scope thereof, which is defined by the appended claims.

REFERENCES

[1] U.S. Pat. No. 5,956,431
[2] G. Campbell, T. A. DeFanti, J. Frederiksen, S. A. Joyce, L. A. Leske, J. A. Lindberg and D. J. Sandin, "Two bit/pixel full color encoding", *SIGGRAPH '86 Conference Proceedings*, Vol. 20, No. 4, pp. 215-223, August, 1986

The invention claimed is:

1. A method of compressing an image block comprising multiple image elements, each image element has a respective color comprising multiple color components, said method comprising the steps of:
   determining a first codeword and a second codeword that are representations of properties of said multiple image elements;
   providing an index sequence of image element associated indices;
   selecting a compressing mode from a first compressing mode and a second compressing mode before, during or after determining said first and second codeword and providing said index sequence; and
   providing a mode index representing said selected compressing mode, wherein if said mode index represents said first compressing mode,
   said first codeword is a color codeword that is representation of the colors of said multiple image elements, said second codeword is an intensity codeword that is a representation of a set of multiple intensity modifiers for modifying the intensity of said multiple image elements by adding an intensity modifier to the multiple color components of a color representation obtainable based on said color codeword and said index sequence comprises, for each image element in said image block, an intensity index associated with
   an intensity modifier from said intensity modifier set, and if said mode index represents said second compressing mode,
   said first codeword and said second codeword are a first color codeword and a second color codeword that are representations of the colors of said multiple image elements, and said index sequence comprises, for each image element in at least a subset of said multiple image elements, a color index associated with said first color codeword or said second color codeword.

2. The method according to claim 1, wherein said selecting step comprises the steps of:
   generating a first measure indicative of an image quality representation associated with compressing said image block according to said first compressing mode;
   generating a second measure indicative of an image quality representation associated with compressing said image block according to said second compressing mode; and
   selecting said compressing mode based on a comparison of said first and second measure.

3. The method according to claim 1, wherein said selecting step comprises the steps of:
   determining a first error representation indicative of representing said image block with said color codeword, said intensity codeword and said intensity index sequence;
   determining a second error representation indicative of representing said image block with said first color codeword, said second color codeword and said color index sequence; and
   selecting said compressing mode based on a comparison of said first error representation and said second error representation.

4. The method according to claim 3, wherein said step of determining said first error representation comprises the steps of:
   generating a first decompressed representation of said image block based on said color codeword, said intensity codeword and said intensity index sequence; and
   generating said first error representation based on a comparison of said image block and said first decompressed representation of said image block.

5. The method according to claim 3, wherein said step of determining said second error representation comprises the steps of:
   generating a second decompressed representation of said image block based on said first and second color codeword and said color index sequence; and
   generating said second error representation based on a comparison of said image block and said second decompressed representation of said image block.

6. The method according to claim 1, wherein said color index sequence comprises, for each image element in a first subset of said multiple image elements, a color index associated with said first or second color codeword, each image element in a second remaining subset of said multiple image elements is associated with a pre-defined color codeword selected from said first or second color codeword.

7. The method according to claim 1, wherein said second color codeword comprises a function representation enabling generation of a color representation using said first color codeword.

8. A method of encoding an image, said method comprising the steps of:
   decomposing said image into multiple image blocks, each image block comprising multiple image elements; and
   determining, for at least one image block, a compressed image block representation by compressing said at least one image block according to claim 1.

9. A method of processing a compressed representation of an image block comprising multiple image elements, said compressed image block representation comprises a mode index, a first codeword, a second codeword and an index sequence of image element associated indices, and said method comprising the steps of:
   selecting a decompressing mode based on said mode index; and
   generating a decompressed representation of said image block based on said first and second codeword and said index sequence, wherein if said mode index represents a first decompressing mode, said first codeword is a color codeword, said second codeword is an intensity codeword and said index sequence is an intensity index sequence, and said generating step comprises the steps of:

provide a set of multiple intensity modifiers based on said intensity codeword;

for at least one image element in said image block:
generating a color representation comprising multiple color components based on said color codeword;
selecting an intensity modifier from said intensity modifier set based on said intensity index sequence; and
modifying the intensity of said at least one image element based on said selected intensity modifier by adding said selected intensity modifier to said multiple color components of said color representation;

and if said mode index represents a second decompressing mode, said first codeword is a first color codeword, said second codeword is a second color codeword and said index sequence is a color index sequence, and said generating step comprises, for at least one image element in said image block, the step of:
generating a color representation based on at least one color codeword selected from said first and second color codeword.

10. The method according to claim 9, wherein said color index sequence comprises, for each image element in a first subset of said multiple image elements, a color index associated with said first or second color codeword, each image element in a second remaining subset of said multiple image elements is associated with a pre-defined color codeword selected from said first or second color codeword.

11. The method according to claim 10, wherein said color representation generating step comprises, if said mode index represents said second decompressing mode, the step of:
generating said color representation based on a color codeword selected from said first and second color codeword using said color index sequence for an image element in said first subset of multiple image elements; and
generating said color representation based on said pre-defined color codeword for an image element in said second remaining subset of said multiple image elements.

12. The method according to claim 9, wherein said color representation generating step comprises, if said mode index represents said second decompressing mode, the step of:
generating said color representation based on said first and second color codeword.

13. A method of decoding an encoded image that comprises compressed representations of image blocks comprising multiple image elements, a compressed image block representation comprises a mode index, a first codeword, a second codeword and an index sequence of image element associated indices, and said method comprises the steps of:
determining, for at least one compressed image block representation, at least one decompressed image element representation by processing said at least one compressed image block representation according to claim 9; and
generating an image by processing said at least one decompressed image element representation.

14. A system for compressing an image block comprising multiple image elements, each image element having a respective color comprising multiple color components, said system comprising:

a codeword generator for determining a first codeword and a second codeword that are representations of properties of said multiple image elements;
means for providing an index sequence of image element associated indices;
a mode selector for selecting a compressing mode from a first compressing mode and a second compressing mode before, during or after said codeword generator determines said first and second codeword and said providing means provides said index sequence; and
means for providing a mode index representing said selected compressing mode, wherein if said mode index represents said first compressing mode,
said first codeword is a color codeword that is representation of the colors of said multiple image elements, said second codeword is an intensity codeword that is a representation of a set of multiple intensity modifiers for modifying the intensity of said multiple image elements by adding an intensity modifier to the multiple color components of a color representation obtainable based on said color codeword and said index sequence comprises, for each image element in said image block, an intensity index associated with an intensity modifier from said intensity modifier set,
and if said mode index represents said second compressing mode,
said first codeword and second codeword are a first color codeword and a second color codeword that are representations of the colors of said multiple image elements, and said index sequence comprises, for each image element in at least a subset of said multiple image elements, a color index associated with said first color codeword or said second color codeword.

15. The system according to claim 14, wherein said mode selector comprises:
a measure generator for generating a first measure indicative of an image quality representation associated with compressing said image block according to said first compressing mode and for generating a second measure indicative of an image quality representation associated with compressing said image block according to said second compressing mode; and
a measure selector for selecting said compressing mode based on a comparison of said first and second measure.

16. The system according to claim 14, wherein said compressing mode selector comprises:
an error estimator for determining a first error representation indicative of representing said image block with said color codeword, said intensity codeword and said intensity index sequence and for determining a second error representation indicative of representing said image block with said first color codeword, said second color codeword and said color index sequence; and
an error selector for selecting said compressing mode based on a comparison of said first error representation and said second error representation.

17. The system according to claim 14, wherein said color index sequence comprises, for each image element in a first subset of said multiple image elements, a color index associated with said first or second color codeword, each image element in a second remaining subset of said multiple image elements is associated with a pre-defined color codeword selected from said first or second color codeword.

18. The system according to claim 14, wherein said second color codeword comprises a function representation enabling generation of a color representation using said first color codeword.

19. An image encoding system comprising:
   an image decomposer for decomposing an image into multiple image blocks, each image block comprising multiple image elements; and
   at least one image block compressing system according to claim 14.

20. A system for processing a compressed representation of an image block comprising multiple image elements, said compressed image block representation comprises a mode index, a first codeword, a second codeword and an index sequence of image element associated indices, said system comprising:
   a decompressing mode selector for selecting a decompressing mode based on said mode index;
   a color generator;
   an index selector;
   means for providing a set of multiple intensity modifiers; and
   an intensity modifier unit,
wherein if said mode index represents a first decompressing mode, said first codeword is a color codeword, said second codeword is an intensity codeword and said index sequence is an intensity index sequence,
   said providing means is operated for providing a set of multiple intensity modifiers based on said intensity codeword,
   said color generator is operated for generating a color representation comprising multiple color components for at least one image element in said image block based on said color codeword,
   said index selector is operated for selecting, for said at least one image element, an intensity modifier from said identified intensity modifier set based on said intensity index sequence, and
   said intensity modifier unit is operated for modifying the intensity of said at least one image element based on said selected intensity modifier by adding said selected intensity modifier to said multiple color components of said color representation, and
   if said mode index represents a second decompressing mode, said first codeword is a first color codeword, said second codeword is a second color codeword and said index sequence is a color index sequence,
   said color generator is operated for generating a color representation based on at least one color codeword selected by said index selector from said first and second color codeword.

21. The system according to claim 20, wherein said color index sequence comprises, for each image element in a first subset of said multiple image elements, a color index associated with said first or second color codeword, each image element in a second remaining subset of said multiple image elements is associated with a pre-defined color codeword selected from said first or second color codeword.

22. The system according to claim 21, wherein said color generator is operated, if said mode index represents said second decompressing mode, for generating said color representation based on a color codeword selected from said first and second color codeword using said color index sequence for an image element in said first subset of multiple image elements and for generating said color representation based on said pre-defined color codeword for an image element in said second remaining subset of said multiple image elements.

23. The system according to claim 20, wherein said color generator is operated for generating said color representation based on said first and second color codeword if said mode index represents said second decompressing mode.

24. A system for decoding an encoded image that comprises compressed representations of image blocks comprising multiple image elements, a compressed image block representation comprises a mode index, a first codeword, a second codeword and an index sequence of image element associated indices, and said system comprises:
   at least one system according to claim 20, for determining, for at least one compressed image block representation, at least one decompressed image element representation; and
   means for processing said at least one decompressed image element representation in order to generate an image.

25. An image processing terminal comprising a system according to claim 14.

* * * * *

UNITED STATES PATENT AND TRADEMARK OFFICE
CERTIFICATE OF CORRECTION

| | |
|---|---|
| PATENT NO. | : 7,734,105 B2 |
| APPLICATION NO. | : 10/583453 |
| DATED | : June 8, 2010 |
| INVENTOR(S) | : Strom et al. |

Page 1 of 2

It is certified that error appears in the above-identified patent and that said Letters Patent is hereby corrected as shown below:

In Column 18, Line 63, delete " $(\check{R}, \overline{G}, \check{B})$ " and insert -- $(\hat{\bar{R}}, \hat{\bar{G}}, \hat{\bar{B}})$ --, therefor.

In Column 19, Line 57, delete " $(\check{R}, \overline{G}, \check{B})$ " and insert -- $(\hat{\bar{R}}, \hat{\bar{G}}, \hat{\bar{B}})$ --, therefor.

In Column 19, Line 60, in Equation (4), delete " $\epsilon^2 = (R_{low}\alpha - \overline{R})^2$ " and insert -- $\epsilon^2 = (R_{low} + \alpha - \overline{R})^2$ --, therefor.

In Column 20, Line 17, delete " $(\check{R}, \overline{G}, \check{B})$ " and insert -- $(\hat{\bar{R}}, \hat{\bar{G}}, \hat{\bar{B}})$ --, therefor.

In Column 20, Line 44, delete "0)," and insert -- 0, --, therefor.

In Column 20, Lines 46-47, delete "quantization" and insert -- quantizations --, therefor.

In Column 21, Line 15, delete "explicity" and insert -- explicitly --, therefor.

In Column 21, Line 17, delete "in Table" and insert -- of Table --, therefor.

In Column 24, Line 24, after "to" delete "the".

In Column 24, Line 49, delete "identifing," and insert -- identifying, --, therefor.

In Column 32, Line 31, delete "compressed." and insert -- compressed --, therefor.

In Column 32, Line 52, delete "300" and insert -- 300, --, therefor.

Signed and Sealed this
First Day of February, 2011

David J. Kappos
*Director of the United States Patent and Trademark Office*

CERTIFICATE OF CORRECTION (continued)
U.S. Pat. No. 7,734,105 B2

In Column 38, Line 10, delete "dampers" and insert -- clampers --, therefor.

In Column 38, Line 19, delete "dampers" and insert -- clampers --, therefor.

In Column 38, Line 21, delete "dampers" and insert -- clampers --, therefor.

In Column 38, Line 34, delete "dampers" and insert -- clampers --, therefor.

In Column 38, Line 35, delete "damper" and insert -- clamper --, therefor.

In Column 40, Line 21, delete "$0_{bin}.$" and insert -- $0_{bin}$ --, therefor.

In Column 40, Line 43, delete "dampers" and insert -- clampers --, therefor.

In Column 40, Line 52, delete "dampers" and insert -- clampers --, therefor.

In Column 40, Line 58, delete "dampers" and insert -- clampers --, therefor.

In Column 41, Line 28, delete "1986" and insert -- 1986. --, therefor.

In Column 46, Line 34, in Claim 24, delete "20," and insert -- 20 --, therefor.